United States Patent
Fukui et al.

(10) Patent No.: US 10,157,216 B2
(45) Date of Patent: Dec. 18, 2018

(54) DATA MANAGEMENT SYSTEM AND DATA MANAGEMENT METHOD

(71) Applicant: YOKOGAWA ELECTRIC CORPORATION, Musashino-shi, Tokyo (JP)

(72) Inventors: Takahisa Fukui, Tokyo (JP); Hiroaki Kanokogi, Tokyo (JP); Ryouhei Furihata, Tokyo (JP); Masayasu Sano, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 325 days.

(21) Appl. No.: 15/150,481

(22) Filed: May 10, 2016

(65) Prior Publication Data
US 2016/0342672 A1    Nov. 24, 2016

(30) Foreign Application Priority Data
May 21, 2015    (JP) .................................. 2015-103744

(51) Int. Cl.
*G06F 17/30*    (2006.01)
*H04L 29/08*    (2006.01)

(52) U.S. Cl.
CPC ...... *G06F 17/30575* (2013.01); *G06F 17/302* (2013.01); *G06F 17/30876* (2013.01); *H04L 67/1095* (2013.01)

(58) Field of Classification Search
CPC ............. G06F 17/30575; G06F 17/302; G06F 17/30876; G06F 17/30; H04L 67/1095; H04L 29/08
See application file for complete search history.

(56) References Cited

U.S. PATENT DOCUMENTS

| 2004/0015478 A1* | 1/2004 | Pauly ................ G06F 17/30327 707/E17.001 |
| 2005/0015773 A1* | 1/2005 | Gorman .............. G06F 11/3495 719/310 |
| 2007/0143455 A1* | 6/2007 | Gorman .............. G06F 11/3495 709/223 |
| 2012/0330931 A1 | 12/2012 | Nakano et al. |
| 2013/0013606 A1* | 1/2013 | Stanfill ............. G06F 17/30297 707/737 |
| 2013/0283053 A1* | 10/2013 | Hwang ............ H04N 21/44213 713/168 |

(Continued)

FOREIGN PATENT DOCUMENTS

| JP | 2011-221799 A | 11/2011 |
| JP | 2012-123544 A | 6/2012 |
| JP | 2014-211790 A | 11/2014 |

*Primary Examiner* — Anh Ly
(74) *Attorney, Agent, or Firm* — Sughrue Mion, PLLC

(57) ABSTRACT

Provided is a data management system including a plurality of nodes to be connected to and disconnected from a network. At least one of the plurality of nodes includes: a communicator that performs a communication via the network by using data having a data structure including a key; a database that accumulates the data; and a data analyzer that, when the node is newly connected to the network, provides another node already connected to the network with node information, the node information being used for enabling the node to serve as node for accumulating the data.

16 Claims, 19 Drawing Sheets

(56) References Cited

U.S. PATENT DOCUMENTS

| | | | |
|---|---|---|---|
| 2014/0289323 A1* | 9/2014 | Kutaragi | G06Q 50/01 709/203 |
| 2014/0297826 A1 | 10/2014 | Park | |
| 2015/0032684 A1* | 1/2015 | Gupta | G06F 17/30575 707/600 |
| 2015/0281345 A1* | 10/2015 | Kobayashi | H04L 67/1008 709/226 |
| 2016/0103870 A1* | 4/2016 | Patiejunas | H04L 51/24 707/667 |
| 2016/0210237 A1* | 7/2016 | Kobayashi | G06F 17/3048 709/223 |

* cited by examiner

FIG. 3

| NODE ID | PARTITION KEY | PROCESSING CAPABILITY | OPERATION RATE |
|---|---|---|---|
| A-1 | A | 100 | 100 |
| A-2 | A | 50 | 100 |
| A-3 | A | 20 | 10 |
| A-4 | A | 20 | 10 |
| B-1 | B | 100 | 100 |
| B-2 | B | 25 | 100 |

FIG. 4

| PARTITION KEY | RANGE KEY |
|---|---|
| A | 2015-01-01-01 : 00 |
| A | 2015-01-01-06 : 00 |
| A | 2015-01-02-12 : 00 |
| A | 2015-01-02-18 : 00 |
| A | 2015-01-02-22 : 00 |
| A | 2015-01-03-01 : 00 |
| A | 2015-01-03-04 : 00 |
| B | 2015-01-01-01 : 00 |
| B | 2015-01-01-19 : 00 |

| COMPUTATION CONDITION OF SAVING DESTINATION | NO DATA IS SAVED IN NODE HAVING OPERATION RATE OF 10% OR LESS |
|---|---|
| | DATA IS DISTRIBUTED ON BASIS OF TIME INFORMATION OF RANGE KEY AT RATIO OF PROCESSING CAPABILITIES IN DESCENDING ORDER OF PROCESSING CAPABILITY OF NODE |

FIG. 9

| PARTITION KEY | RANGE KEY | DATA PART |
|---|---|---|
| A | 2015-01-01-01 : 00 | MEASUREMENT DATA, ETC |
| B | 2015-01-01-01 : 00 | MEASUREMENT DATA, ETC |
| A | 2015-01-01-06 : 00 | MEASUREMENT DATA, ETC |
| A | 2015-01-02-12 : 00 | MEASUREMENT DATA, ETC |
| A | 2015-01-02-18 : 00 | MEASUREMENT DATA, ETC |
| B | 2015-01-02-19 : 00 | MEASUREMENT DATA, ETC |
| A | 2015-01-02-22 : 00 | MEASUREMENT DATA, ETC |
| A | 2015-01-03-01 : 00 | MEASUREMENT DATA, ETC |
| A | 2015-01-03-04 : 00 | MEASUREMENT DATA, ETC |

(PARTITION KEY and RANGE KEY together form the KEY PART)

FIG. 17

| NODE ID | PROCESSING CAPABILITY | OPERATION RATE |
|---|---|---|
| A-1 | 100 | 90 |
| A-2 | 80 | 80 |
| A-3 | 60 | 70 |

FIG. 18

| DATA NAME | RANGE KEY |
|---|---|
| DATA A | 2015-01-01-02:00 |
| DATA B | 2015-01-01-03:00 |
| DATA C | 2015-01-01-05:00 |
| DATA D | 2015-01-01-06:30 |
| DATA E | 2015-01-01-07:00 |
| DATA F | 2015-01-01-09:00 |
| DATA G | 2015-01-01-11:00 |
| DATA H | 2015-01-01-13:00 |
| DATA I | 2015-01-01-14:00 |
| DATA J | 2015-01-01-16:00 |
| DATA K | 2015-01-01-17:30 |
| DATA L | 2015-01-01-20:00 |
| DATA M | 2015-01-01-21:00 |
| DATA N | 2015-01-01-22:00 |
| DATA O | 2015-01-01-23:00 |

DATA MANAGEMENT SYSTEM AND DATA MANAGEMENT METHOD

BACKGROUND OF THE INVENTION

Field of the Invention

The present invention relates to a data management system and a data management method using a key-value type database.

Priority is claimed on Japanese Patent Application No. 2015-103744, filed May 21, 2015, the contents of which are incorporated herein by reference.

Description of Related Art

All patents, patent applications, patent publications, scientific articles, and the like, which will hereinafter be cited or identified in the present application, will hereby be incorporated by reference in their entirety in order to describe more fully the state of the art to which the present invention pertains.

Generally, when measured data is managed, the data is accumulated in a relational database (RDB) for collecting the data from a sensor using a setting terminal or the like directly connected to a measurement device such as a sensor (for example, see Japanese Unexamined Patent Application, First Publication No. 2011-221799).

In particular, thousands of measurement devices are attached to various parts of a facility such as a plant. The measurement devices continuously transmit measurement results in units of seconds via the above-described setting terminal. Thus, an amount of data accumulated in plant management is considered to be significantly large. There is a demand for connecting the setting terminal to the measurement device in the plant and performing data measurement while checking the part to which the measurement device is attached. Thus, when the measured data is accumulated, the setting terminal is frequently connected to a network of the data management system and a disconnection operation is performed after the data is accumulated.

Also, a key-value database which has recently attracted attention is an example of a not only SQL (NoSQL) database, and has a more flexible data structure than the RDB. The data structure of the key-value database is directed to the distribution of a store (storage) and considered to outperform a general RDB in availability and reading performance for a large amount of data (for example, see Japanese Unexamined Patent Application, First Publication No. 2014-211790).

On the other hand, it is desirable that a connection to or a disconnection from a network of a data management system using an NoSQL database operate to be enabled in any node in data management of the plant as described above. This node represents a server, a personal computer (hereinafter referred to simply as PC), and a setting terminal (for example, a portable terminal such as a tablet terminal) in the data management system.

However, the above-described key-value type database is a distribution type database for distributing and storing data through terminals to accumulate a large volume of data and the data is accumulated in storage media of a plurality of nodes.

Therefore, there is a problem in that the node connected to the network is not effectively utilized as a storage medium for storing a large volume of data because no data is accumulated in a newly connected node or because a detached node is not used for accumulating data either when the node optionally operates to be connectable to a network or detachable from the network.

SUMMARY

The present invention has been made in view of such situations and provides a data management system and a data management method capable of effectively using a storage medium of a node optionally connectable to a network or detachable from the network to accumulate data within the system.

According to a first aspect of the present invention, a data management system includes a plurality of nodes to be connected to and disconnected from a network, wherein at least one of the plurality of nodes includes: a communicator that performs a communication via the network by using data having a data structure including a key; a database that accumulates the data; and a data analyzer that, when the node is newly connected to the network, provides another node already connected to the network with node information, the node information being used for enabling the node to serve as node for accumulating the data.

According to a second aspect of the present invention, in the data management system according to the first aspect, the node information may be used to extract the node in which writing and/or reading of the data are/is performed.

According to a third aspect of the present invention, in the data management system according to the first or second aspect, the data analyzer may extract the node to which the accumulated data is written or from which the accumulated data is read according to a key of the accumulated data of a write or read target and node information of each of the nodes at the time of connecting to the network to write the accumulated data to each of the nodes within the network to accumulate the written data or read the accumulated data from each node.

According to a fourth aspect of the present invention, in the data management system according to the first or second aspect, the key may include a time at which the accumulated data was measured and the node information includes processing capability and an operation rate of the node, the data analyzer may select the node of the operation rate greater than or equal to a predetermined threshold value as a node for saving the accumulated data and sets an allocation time range for allocating the accumulated data according to a measured time for each selected node by dividing a time range indicating a range of a time at which the accumulated data is measured in correspondence with the processing capability.

According to a fifth aspect of the present invention, in the data management system according to the fourth aspect, the data analyzer may replicate the accumulated data accumulated in the node for another node.

According to a sixth aspect of the present invention, in the data management system according to the fifth aspect, the data analyzer may compute an acquisition rate of data on the basis of an operation rate of each of the node and the other node when the data is replicated and further replicates the accumulated data of the node in another node different from the other node until the acquisition rate becomes a preset value.

According to a seventh aspect of the present invention, in the data management system according to the fifth or sixth aspect, the data analyzer may map a time included in the time range to a circumference of a circle according to an algorithm of a consistent hashing method, map the allocation time range of a hash value corresponding to the node to the circumference in correspondence with the time according to a hash function serving as the hash value corresponding to the allocation time range of each of the nodes, and sequentially generate replicated data which is a replication of its own accumulated data from the allocation time range of another adjacent node on the circumference.

According to an eighth aspect of the present invention, in the data management system according to any one of the fifth to seventh aspects, when the reading of the node is not performed, the data analyzer of the other node may recover the accumulated data of the node from the replicated data of the accumulated data of the node stored by its own node and designates unreadable accumulated data of the node as its own accumulated data.

According to a ninth aspect of the present invention, in the data management system according to the seventh or eighth aspect, the data analyzer may compute hash values equal in number to processing capabilities of the nodes according to the hash function and designates an allocation time range of a virtual node by mapping the hash values to the circumference and distributing the mapped hash values in an allocation time range obtained by dividing the time range by a total value of the hash values of the nodes mapped to the circumference.

According to a tenth aspect of the present invention, a data management method of accumulating data by distributing the data to a plurality of nodes connected to a network using a data structure corresponding to a key for a network system which operates to be able to connect a node to the network or detach the node from the network includes a data analysis process in which, when the node is newly connected to the network, a data analyzer of the node provides another node already connected to the network with node information, the node information being used for enabling the node to serve as node for accumulating the data.

According to an eleventh aspect of the present invention, in the data management method according to the tenth aspect, the node information may be used to extract the node in which writing and/or reading of the data are/is performed.

According to a twelfth aspect of the present invention, the data management method according to the tenth or eleventh aspect may further include a process in which the data analyzer extracts the node to which the accumulated data is written or from which the accumulated data is read according to a key of the accumulated data of a write or read target and node information of each of the nodes at the time of connecting to the network to write the accumulated data to each of the nodes within the network to accumulate the written data or read the accumulated data from each node.

According to a thirteenth aspect of the present invention, in the data management method according to the tenth or eleventh aspect, the key may include a time at which the accumulated data was measured and the node information includes processing capability and an operation rate of the node, and the data management method may further include a process in which the data analyzer selects the node of the operation rate greater than or equal to a predetermined threshold value as a node for saving the accumulated data and sets an allocation time range for allocating the accumulated data according to a measured time for each selected node by dividing a time range indicating a range of a time at which the accumulated data is measured in correspondence with the processing capability.

According to a fourteenth aspect of the present invention, the data management method according to the thirteenth aspect may further include a process in which the data analyzer replicates the accumulated data accumulated in the node for another node.

According to a fifteenth aspect of the present invention, the data management method according to the fourteenth aspect may further include a process in which the data analyzer computes an acquisition rate of data on the basis of an operation rate of each of the node and the other node when the data is replicated and further replicates the accumulated data of the node in another node different from the other node until the acquisition rate becomes a preset value.

According to a sixteenth aspect of the present invention, the data management method according to the fourteenth or fifteenth aspect may further include a process in which the data analyzer maps a time included in the time range to a circumference of a circle according to an algorithm of a consistent hashing method, maps the allocation time range of a hash value corresponding to the node to the circumference in correspondence with the time according to a hash function serving as the hash value corresponding to the allocation time range of each of the nodes, and sequentially generates replicated data which is a replication of its own accumulated data from the allocation time range of another adjacent node on the circumference.

According to a seventeenth aspect of the present invention, the data management method according to any one of the fourteenth to sixteenth aspect may further include a process in which, when the reading of the node is not performed, the data analyzer of the other node recovers the accumulated data of the node from the replicated data of the accumulated data of the node stored by its own node and designates unreadable accumulated data of the node as its own accumulated data.

According to an eighteenth aspect of the present invention, the data management method according to the sixteenth or seventeenth aspect may further include a process in which the data analyzer computes hash values equal in number to processing capabilities of the nodes according to the hash function and designates an allocation time range of a virtual node by mapping the hash values to the circumference and distributing the mapped hash values in an allocation time range obtained by dividing the time range by a total value of the hash values of the nodes mapped to the circumference.

As described above, according to the present invention, it is possible to cause a node to participate in a network while including a process of accumulating data by providing node information to another node as in a node pre-connected to the network when a terminal is optionally connected to the network as the node, enable the node to be optionally connected to the network or detached from the network, and effectively use a storage medium of a node optionally connectable to the network or detachable from the network in accumulation of data within the system.

BRIEF DESCRIPTION OF THE DRAWINGS

The above features and advantages of the present invention will be more apparent from the following description of certain preferred embodiments taken in conjunction with the accompanying drawings, in which:

FIG. 3 is a diagram illustrating participation node information in which node information of a node connected to a network NW and participating in the data management system 1 is described;

FIG. 4 is a diagram illustrating an example of an index table indicating a search index;

FIG. 9 is a diagram illustrating a correspondence relation between data and a key part formed of a partition key and a range key stored in a database 106 of each node within the data management system 1;

FIG. 17 illustrates participation node information in which node information of a node connected to the network NW and participating in the data management system 1 is described;

FIG. 18 is a diagram illustrating an index table for describing correspondence between data used in the description of this preferred embodiment and a range key corresponding to the data;

DETAILED DESCRIPTION OF THE INVENTION

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

A data management system of the present invention manages accumulation of data through a data structure of a key-value store (performs management of data utilizing a key-value type database) when data is accumulated by distributing the data to a plurality of nodes connected to a network system in the network system which operates to be able to connect a node to a network or detach the node from the network. Thereby, the data management system of the present invention enables a node to be optionally connected to the network or detached from the network by recovering data accumulated in the node in another node when the node participates in the network or is detached from the network while including a process of accumulating data by providing node information to another node as in a node pre-connected to the network when a terminal is optionally connected to the network as the node.

First Preferred Embodiment

Figure 1:
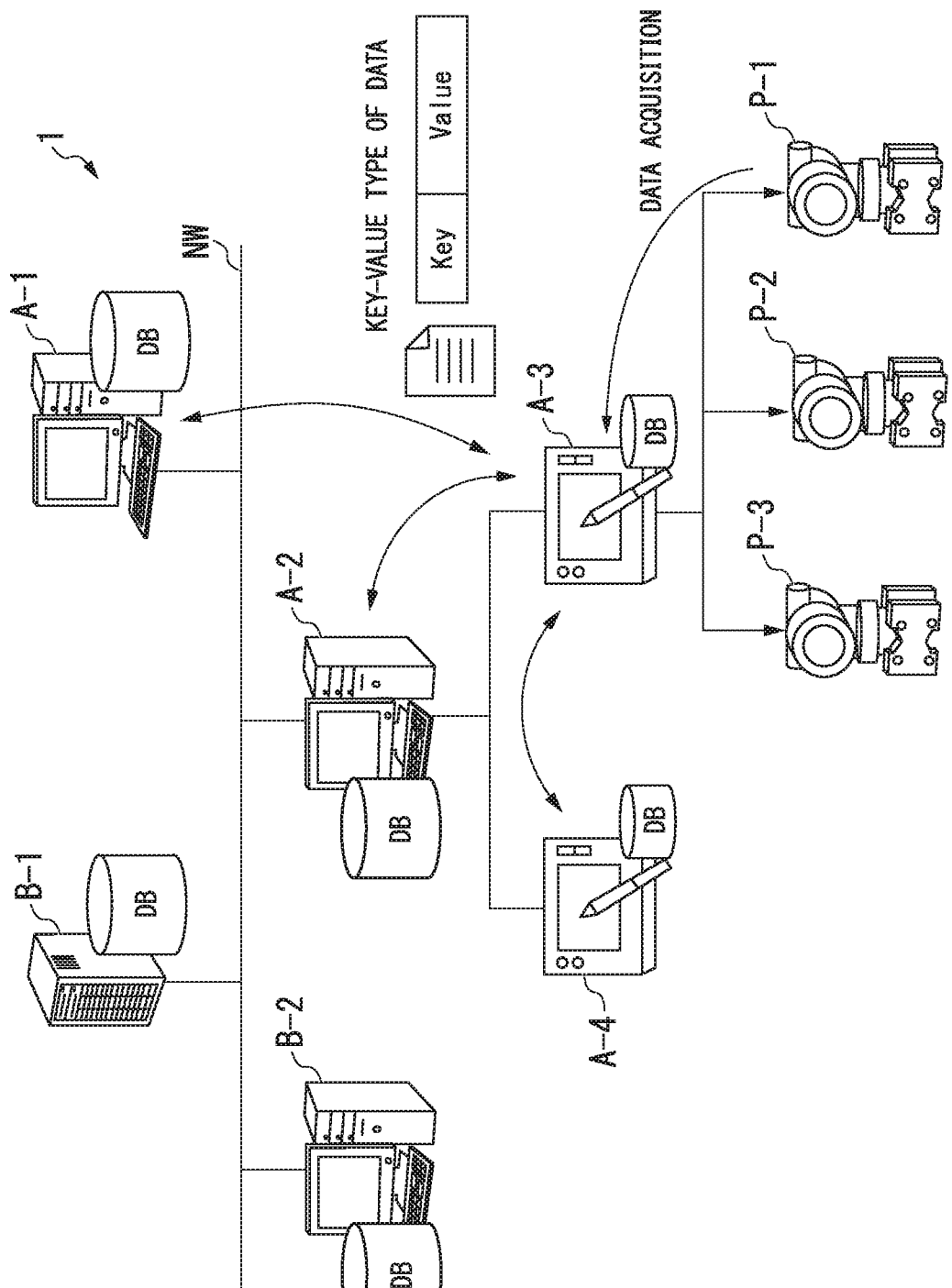
FIG. 1 is a block diagram illustrating a configuration example of a data management system 1 according to a first preferred embodiment of the present invention.

Hereinafter, the first preferred embodiment of the present invention will be described with reference to the drawings. FIG. 1 is a block diagram illustrating a configuration example of a data management system 1 according to the first preferred embodiment of the present invention. The data management system 1 in this preferred embodiment includes servers A-1 and B-1, personal computers A-2 and B-2, and portable terminals A-3 and A-4 each having a database (DB) serving as a storage medium (accumulation medium). In addition, each of the servers A-1 and B-1 and the personal computers A-2 and B-2 is connected to a network NW. In addition, each of the portable terminals A-3 and A-4 is connected to the network NW via the personal computer A-2.

Each of the portable terminals A-3 and A-4 is, for example, a tablet type computer, and reads data measured by each of measurers P-1 to P-3 from the measurers P-1 to P-3 provided within a plant. At this time, each of the portable terminals A-3 and A-4 temporarily accumulates the data in an accumulation medium DB. In the data management system of this preferred embodiment, a type of data to be transmitted/received between nodes of the network or accumulated in the accumulation medium is designated as a key-value type and data management is performed according to a key-value store scheme.

Figure 2:
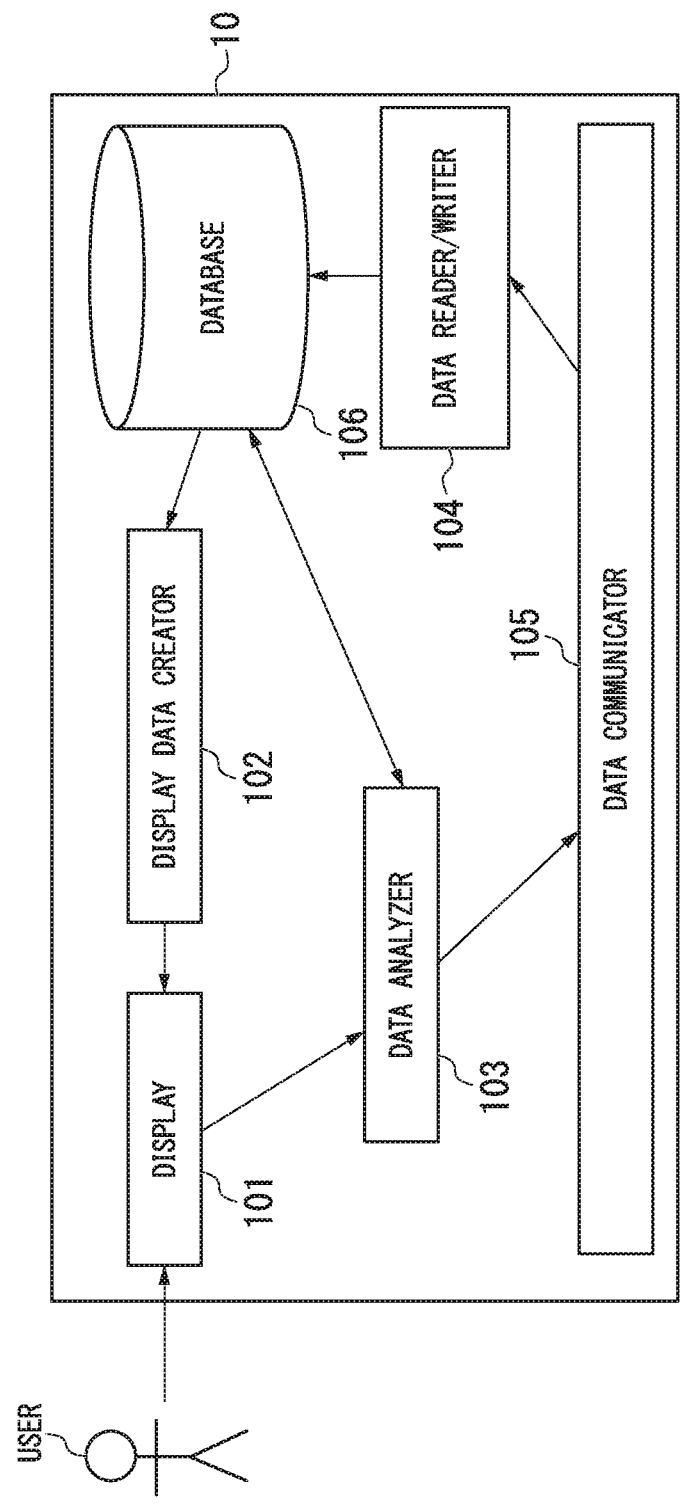
FIG. 2 is a diagram illustrating a configuration example of a data manager in this preferred embodiment.

Each of the servers A-1 and B-1, the personal computers A-2 and B-2, and the portable terminals A-3 and A-4 (hereinafter collectively referred to as nodes) includes a data manager (not illustrated) configured to manage data. FIG. 2 is a diagram illustrating a configuration example of the data manager 10 provided in each node in this preferred embodiment. The data manager 10 includes each of a display 101, a display data creator 102, a data analyzer 103, a data reader/writer 104, a data communicator 105, and a database 106.

The display 101 selects content of a process to be performed on a node and displays an image for inputting text or performs a data input manipulation or displaying for performing reading and writing. The display data creator 102 generates an image including text to be displayed on the display 101. For example, the display data creator 102 generates a character string of data read from the database to be displayed on the display 101 or data read from the measurer P-1 or the like or an image of an input screen for selecting a manipulation.

The data analyzer 103 provides another node already connected to the network NW with node information to be used to extract a node before writing and reading of data are performed to enable each of the nodes to serve as a node for accumulating the data when the node is newly connected to the network NW. Also, the data analyzer 103 extracts a node to which the accumulated data is written or from which the accumulated data is read according to a key of the accumulated data to be read and node information of each of the nodes at the time of connecting to the network NW to write accumulated data and accumulate the accumulated data in each of the nodes within the network NW or read accumulated data from each node (details thereof will be described below).

FIG. 3 is a diagram illustrating participation node information in which node information of a node connected to the network NW and participating in the data management system 1 is described. A record (a data column of a row direction) is formed for each node and corresponds to a node identification (ID) in which each of a partition key, processing capability, and an operation rate is stored. The node ID is information for identifying the node. For example, a code is used as the node ID in this preferred embodiment. The partition key is optionally set to divide the node into a plurality of partitions in the purpose of facilitating management and suppressing an increase of traffic within the network NW when large-scale data is managed through many nodes, and may be omitted. The processing capability is determined by a size of the capacity of the database 106 and a speed of writing of the node. The operation rate indicates a ratio of a time period in which the node is connected to the network NW and participates in the data management system 1 to a time period in which the data management system 1 operates. For example, a node constantly connected to the network NW has an operation rate of 100 and an operation rate of 10 is set for a node that has been disconnected from the network NW for a long time and connected to the network NW only for a short time.

FIG. 4 is a diagram illustrating an example of an index table indicating a search index. The search index, for example, is constituted of a partition key and a range key as keys individually provided in each piece of data. The partition key is a key individually provided in the partition in FIG. 3. The range key indicates a date and a time on which data was measured by the measurer. That is, in this preferred embodiment, the date and the time on which the measurement was performed are used as the range key which is a key for searching for measured data.

Returning to FIG. 2, the data reader/writer 104 reads data corresponding to a key included in a read signal from the database 106 and outputs the read data to the node requesting the reading via the data communicator 105 when the read signal for requesting the reading of the data is input via the data communicator 105. Also, when a write signal for requesting writing of data is input via the data communicator 105, the data reader/writer 104 writes input data to the database 106 in correspondence with a key included in the write signal to store the written data. The data communicator 105 performs a communication via the network by using data having a data structure including a key. The database 106 accumulates the data.

Figure 5:
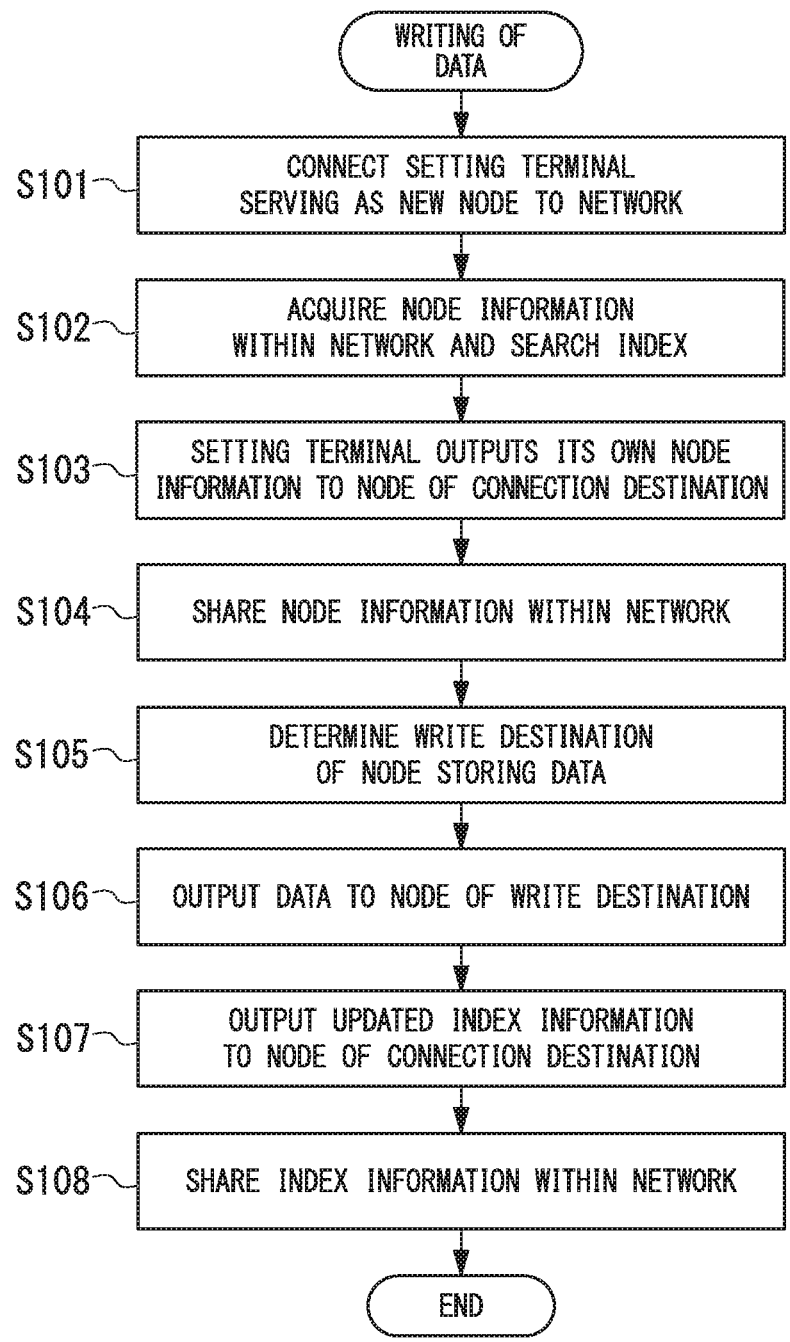
FIG. 5 is a flowchart illustrating an operation example of a process in which a portable terminal A-3 is connected to the network NW when the portable terminal A-3 saves data in the data management system 1 and participates in the data management system 1 as a new node.
Figure 6:
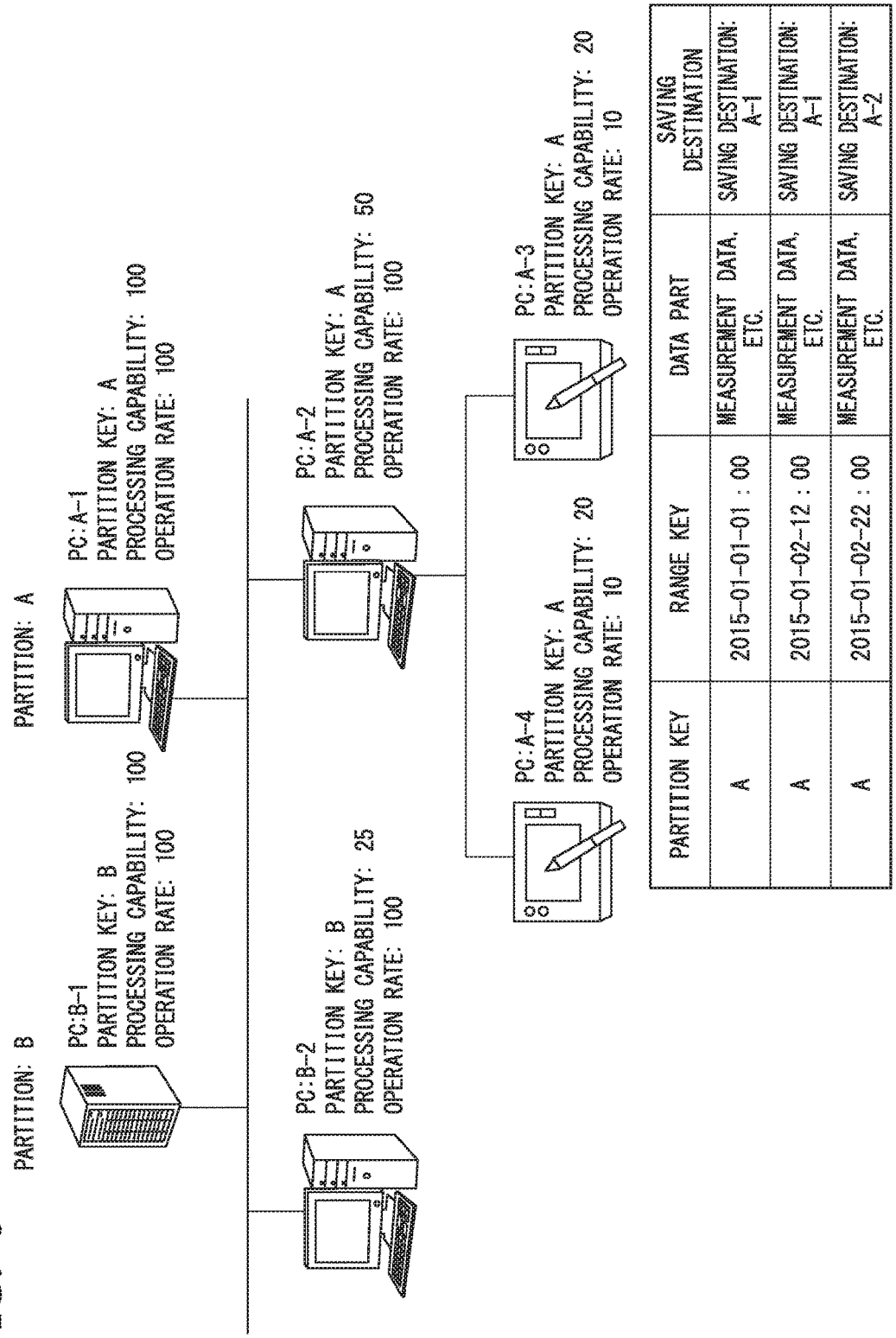
FIG. 6 is a diagram corresponding to FIG. 1 and is a diagram illustrating a process of the flowchart of FIG. 5.

Here, a process in which the portable terminal A-3 is connected to the network NW at the time of saving data in the data management system 1 and participates in the data management system 1 as a new node will be described using FIGS. 5 and 6. FIG. 5 is a flowchart illustrating an operation example of a process in which the portable terminal A-3 is connected to the network NW when the portable terminal A-3 saves data in the data management system 1 and participates in the data management system 1 as a new node. FIG. 6 is a diagram corresponding to FIG. 1 and is a diagram illustrating a process of the flowchart of FIG. 5. Here, each of the servers A-1 and B-1, the personal computers A-2 and B-2, and the portable terminal A-4 is already connected to the network NW and participates in the data management system 1.

(Step S101)

The portable terminal A-3 absorbs (inputs) data measured by the measurer P-1 from the measurer P-1, which is performed according to the user's manipulation. To store the absorbed data within the data management system 1, the portable terminal A-3 is connected to the network NW via the personal computer A-2, which is performed according to the user's manipulation.

(Step S102)

When the portable terminal A-3 is connected, the data analyzer 103 of the personal computer A-2 reads participation node information stored in the database 106 and a search index for the portable terminal A-3. The data analyzer 103 of the personal computer A-2 outputs the read node information and search index to the portable terminal A-3.

Thereby, the data analyzer 103 of the portable terminal A-3 acquires the node information provided from the personal computer A-2 and the index table in which the search index is described. The data analyzer 103 of the portable terminal A-3 adds its own node information to the participation node information and writes the information to the database 106 to store the written information.

(Step S103)

The data analyzer 103 of the portable terminal A-3 outputs the participation node information to which the its own node information is added to each of the servers A-1 and B-1, the personal computers A-2 and B-2, and the portable terminal A-4 which are other nodes via the data communicator 105.

(Step S104)

In each of the servers A-1 and B-1 and the personal computers A-2 and B-2, the data analyzer 103 writes the participation node information to which the node information of the portable terminal A-3 is newly added to the database 106 to store the information. Thereby, the participation node information including the node information of the portable terminal A-3 is shared by nodes in the data management system 1.

(Step S105)

Next, the data analyzer 103 of the portable terminal A-3 obtains a node for accumulating its own held data, that is, a data write destination. Here, the data analyzer 103 of the portable terminal A-3 requests the personal computer A-2 to provide a computation condition of a saving destination.

Thereby, the data analyzer 103 of the personal computer A-2 reads the computation condition of the saving destination from the database 106 and outputs the read computation (selection) condition of the saving destination to the portable terminal A-3.

Figures 7, 8:
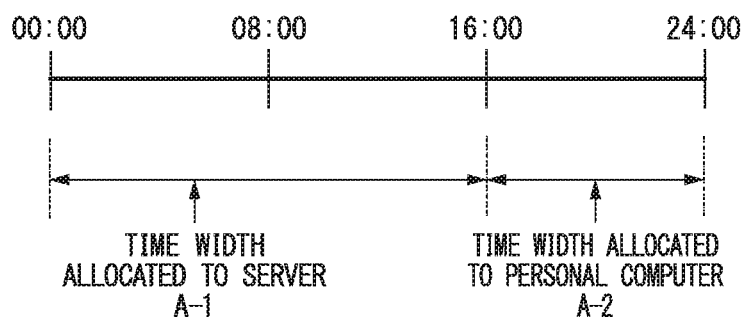
FIG. 7 is a diagram illustrating a configuration example of a computation condition table in which a computation condition of a saving destination of data is described.
FIG. 8 is a diagram illustrating setting of an amount of saved data in each of nodes selected as a saving destination of data.

FIG. 7 is a diagram illustrating a configuration example of a computation condition table in which a computation condition of a saving destination of data is described. For example, one computation condition (selection) is that "no data is saved in a node having an operation rate of 10% or less." At this point, the portable terminals A-3 and A-4 having the operation rates of 10% or less are excluded. For example, another computation condition is "data is distributed on the basis of time information of a range key at a ratio of capabilities in descending order of processing capability of a node." Because a connection to the network NW is established via the personal computer A-2 of the partition A in this preferred embodiment, data of the portable terminal A-3 is also connected to a node of a partition A. Because each of the server A-1 and the personal computer A-2 has an operation rate of 100%, each of the server A-1 and the personal computer A-2 is selected as a saving destination of data.

FIG. 8 is a diagram illustrating setting of an amount of saved data in each of nodes selected as a saving destination of data. The server A-1 has a processing capability of 100 and the personal computer A-2 has a processing capability of 50. Thus, data accumulated in the partition A in the data management system 1 is distributed at a ratio of 2:1 and stored in each of the server A-1 and the personal computer A-2. That is, in this preferred embodiment, data is measured in a time period from 00:00 to 24:00 as a time range (time width) which is a range of time in which accumulated data is measured, that is, a range of time in which a time of a range key is acquired. Each of the server A-1 and the personal computer A-2 accumulates data measured at a ratio of 2:1. Thus, the time range in which data is measured is divided in an allocation time range of 2:1. When a time at which data is measured is included in the allocation time range allocated to each of the server A-1 and the personal computer A-2, each of the server A-1 and the personal computer A-2 accumulates the data measured at that time.

Therefore, because the server A-1 is allocated a time period from 00:00 to 16:00 which is an allocation time range obtained by dividing the time range at a ratio of processing capabilities, data of a range key including a time included in the allocation time range as a measurement time is saved. On the other hand, because an allocation time range from 16:00 to 24:00 which is an allocation time range obtained by dividing the time range at a ratio of processing capabilities is allocated, the server A-2 saves data of a range key including a time included in the allocation time range as the measurement time.

Returning to FIG. 5, the data analyzer 103 of the portable terminal A-3 excludes the portable terminals A-3 and A-4 as saving destinations of the data due to the fact that "no data is saved in a node having an operation rate of 10% or less" as one of the computation (selection) conditions of FIG. 7 and selects the server A-1 and the personal computer A-2 as saving destinations. Also, the data analyzer 103 of the portable terminal A-3 sets the allocation time range stored by the server A-1 to a range of 00:00 to 16:00 and sets the allocation time range stored by the personal computer A-2 to a range of 16:00 to 24:00 in a range of 00:00 to 24:00 which is a time range of a range key based on 100:50 (=2:1) which is a ratio of processing capabilities of the server A-1 and the personal computer A-2 in correspondence with one computation condition that "data is distributed on the basis of time information of a range key at a ratio of capabilities in descending order of processing capability of a node."

The data analyzer 103 of the portable terminal A-3 checks the time of the range key held by the data analyzer 103 and detects whether or not the time of the range key of each data is included in the allocation time range of each of the server A-1 and the personal computer A-2. The data analyzer 103 of the portable terminal A-3 sets a saving destination of data having range keys of 2015-01-01-01:00 and 2015-01-02-12:00 to the server A-1 and sets a saving destination of data having a range key of 2015-01-02-22:00 to the personal computer A-2.

(Step S106)

The data analyzer 103 of the portable terminal A-3 outputs (transmits) the data having the range keys of 2015-01-01-01:00 and 2015-01-02-12:00 to the server A-1. Also, the data analyzer 103 of the portable terminal A-3 outputs the data having the range key of 2015-01-02-22:00 to the personal computer A-2.

Thereby, the data reader/writer 104 of the server A-1 writes the provided data having the range keys of 2015-01-01-01:00 and 2015-01-02-12:00 to the database 106 to store the data in correspondence with the range keys. Likewise, the data reader/writer 104 of the personal computer A-2 writes the provided data having the range key of 2015-01-02-22:00 to the database 106 to store the data in correspondence with the range key.

(Step S107)

Also, the data analyzer 103 of the portable terminal A-3 newly writes the range key of each of the server A-1 and the personal computer A-2 to the index table and outputs the updated index table to the personal computer A-2 via the data communicator 105.

The data analyzer 103 of the personal computer A-2 writes the provided updated index table to the database 106 to store the index table and outputs the index table to each of the server A-1, the portable terminal A-4, the server B-1, and the personal computer B-2.

(Step S108)

The data analyzer 103 of each of the server A-1, the portable terminal A-4, the server B-1, and the personal computer B-2 writes the provided updated index table to the database 106 to store the index table.

Thereby, in terms of the updated index table, index information in the index table is shared in all nodes connected to the network NW of the data management system 1.

FIG. 9 is a diagram illustrating a correspondence relation between data and a key part formed of a partition key and a range key stored in a database 106 of each node within the data management system 1. Although a key part is constituted of each of a partition key and a range key in FIG. 9, the key part may be formed of only the range key without using the partition key when it is unnecessary to divide a node connected to the network into partitions as described above. The information of the key part in FIG. 9 is shared within the data management system 1 according to the index table (FIG. 4).

Figure 10:
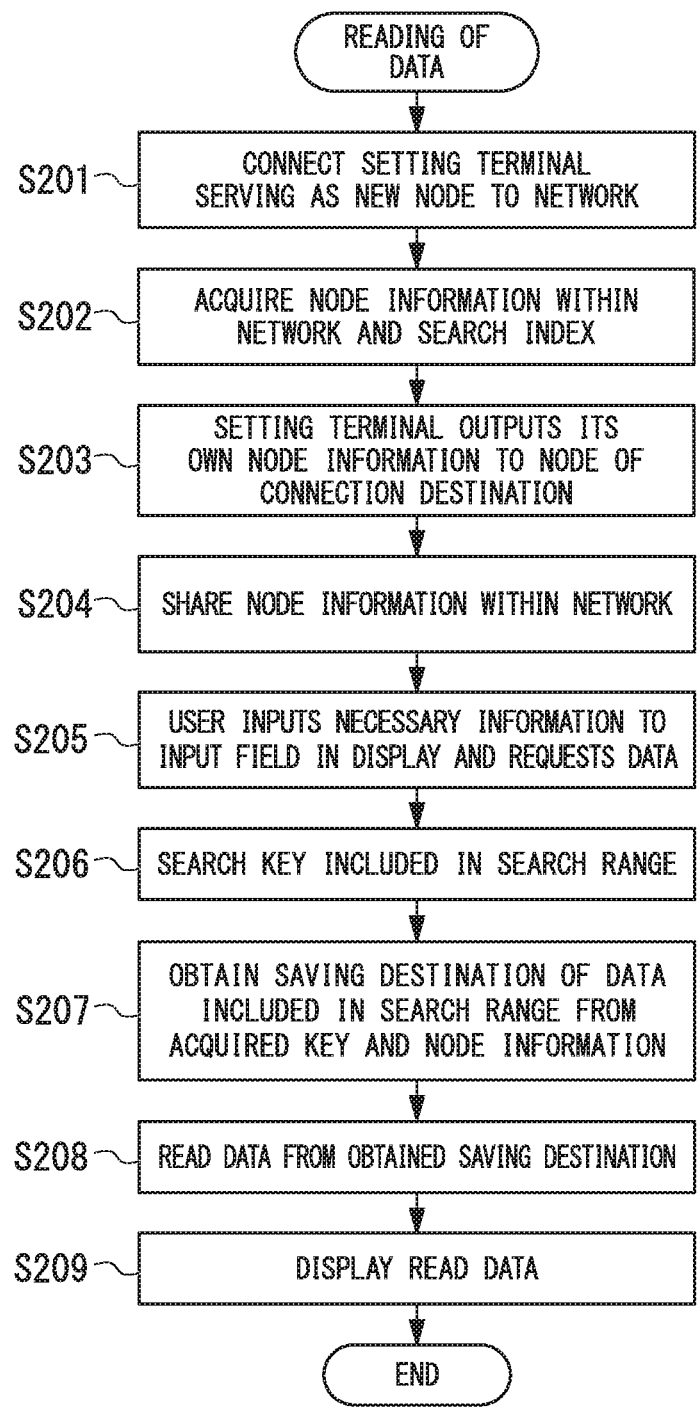
FIG. 10 is a flowchart illustrating an operation example of a process in which a portable terminal A-3 is connected to the network NW and participates in the data management system 1 as a new node.
Figure 11:
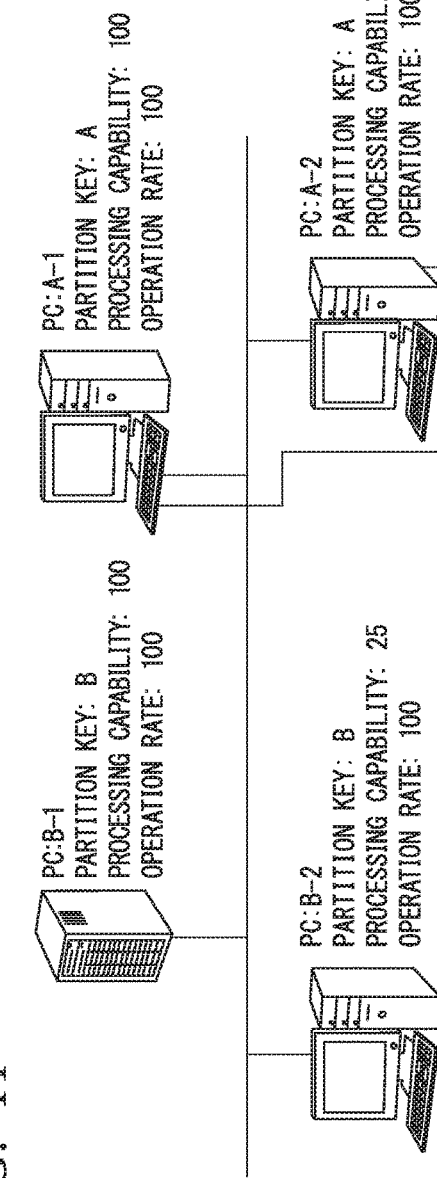
FIG. 11 is a diagram corresponding to FIG. 1 and is a diagram illustrating a process of the flowchart of FIG. 10.
Figure 11:
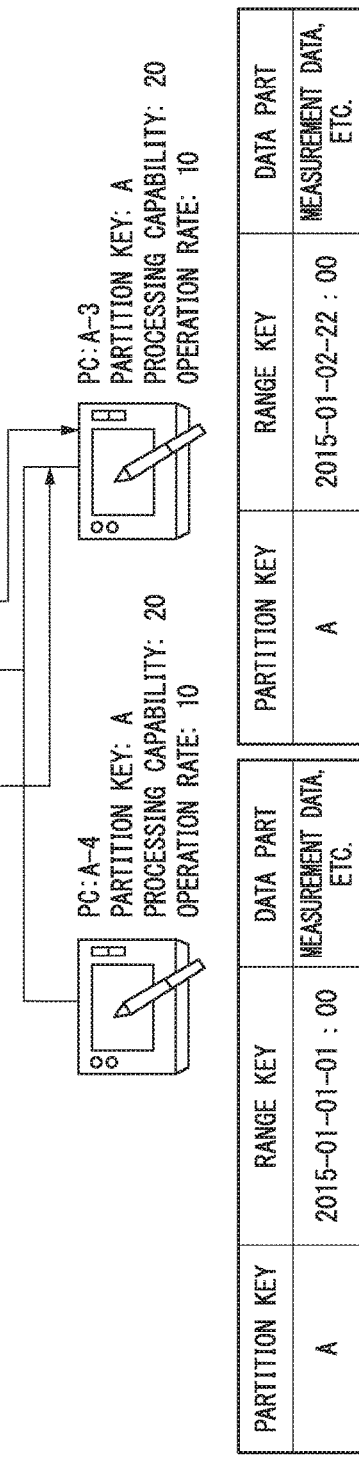

A process in which the portable terminal A-3 is connected to the network NW and participates in the data management system 1 as a new node when the portable terminal A-3 reads data will be described using FIGS. 10 and 11. FIG. 10 is a flowchart illustrating an operation example of the process in which the portable terminal A-3 is connected to the network NW and participates in the data management system 1 as the new node. FIG. 11 is a diagram corresponding to FIG. 1 and is a diagram illustrating a process of the flowchart of FIG. 10. Here, each of the servers A-1 and B-1, the personal computers A-2 and B-2, and the portable terminal A-4 is already connected to the network NW and participates in the data management system 1.

(Step S201)

In order to read data previously measured by the measurer P-1 from the data management system 1, the portable terminal A-3 is connected to the network NW via the personal computer A-2, which is performed according to the user's manipulation.

(Step S202)

When the portable terminal A-3 is connected, the data analyzer 103 of the personal computer A-2 reads participation node information and a search index stored in the database 106 for the portable terminal A-3. The data analyzer 103 of the personal computer A-2 outputs the read node information and search index to the portable terminal A-3.

Thereby, the data analyzer 103 of the portable terminal A-3 acquires the node information provided from the personal computer A-2 and the index table in which the search index is described. The data analyzer 103 of the portable terminal A-3 adds its own node information to the participation node information and writes the information to the database 106 to store the written information.

(Step S203)

The data analyzer 103 of the portable terminal A-3 outputs the participation node information to which its own node information is added to the servers A-1 and B-1, the personal computers A-2 and B-2, and the portable terminal A-4 which are other nodes via the data communicator 105.

(Step S204)

In each of the servers A-1 and B-1 and the personal computers A-2 and B-2, the data analyzer 103 writes the participation node information to which the node information of the portable terminal A-3 is newly added to the database 106 to store the participation node information. Thereby, the participation node information including the node information of the portable terminal A-3 is shared by nodes in the data management system 1.

(Step S205)

The user inputs date and time information indicating a search range as necessary information indicating whether to read data for an input field displayed on the display 101 of the portable terminal A-3.

Thereby, the data analyzer 103 of the portable terminal A-3 receives a data read request and extracts a search range in the input range key.

(Step S206)

The data analyzer 103 of the portable terminal A-3 detects a range key having a time included in the extracted search range from the index table.

(Step S207)

Next, the data analyzer 103 of the portable terminal A-3 obtains a node in which data of the range key of the search range input by the user is stored, that is, a node requesting the reading of the data. Here, the data analyzer 103 of the portable terminal A-3 requests the personal computer A-2 to provide a computation condition of a saving destination.

Thereby, the data analyzer 103 of the personal computer A-2 reads the computation condition of the saving destination from the database 106 and outputs the read computation (selection) condition of the saving destination to the portable terminal A-3.

The data analyzer 103 of the portable terminal A-3 excludes the portable terminals A-3 and A-4 as the saving destination of the data due to the fact that "no data is saved in a node having an operation rate of 10% or less" as the one of the computation (selection) conditions of FIG. 7 and selects the server A-1 and the personal computer A-2 as a saving destination. Also, the data analyzer 103 of the portable terminal A-3 sets the allocation time range stored by the server A-1 to a range of 00:00 to 16:00 and sets the allocation time range stored by the personal computer A-2 to a range of 16:00 to 24:00 in a range of 00:00 to 24:00 which is a time range of a range key based on 100:50 (=2:1) which is a ratio of processing capabilities of the server A-1 and the personal computer A-2 in correspondence with one computation condition that data is distributed on the basis of time information of a range key at a ratio of capabilities in descending order of processing capability of a node."

The data analyzer 103 of the portable terminal A-3 checks the time of the range key held by the data analyzer 103 and detects whether or not the time of the range key of each read data is included in the allocation time range of one of the server A-1 and the personal computer A-2. The data analyzer 103 of the portable terminal A-3 extracts (computes) a saving destination of data having range keys of 2015-01-01-01:00, 2015-01-01-06:00, 2015-01-02-12:00, and 2015-01-02-18:00 as the server A-1 and extracts (computes) a saving destination of data having a range key of 2015-01-02-22:00 as the personal computer A-2.

(Step S208)

The data analyzer 103 of the portable terminal A-3 requests the server A-1 to read the data having the range keys of 2015-01-01-01:00, 2015-01-01-06:00, 2015-01-02-12:00, and 2015-01-02-18:00. Also, the data analyzer 103 of the portable terminal A-3 requests the personal computer A-2 to read the data having the range key of 2015-01-02-22:00.

Thereby, the data reader/writer 104 of the server A-1 reads the data having the provided range keys of 2015-01-01-01:00, 2015-01-01-06:00, 2015-01-02-12:00, and 2015-01-02-18:00 from the database 106 in correspondence with the range keys and transmits the read data to the portable terminal A-3 via the data communicator 105. Likewise, the data reader/writer 104 of the personal computer A-2 reads data having a provided range key of 2015-01-02-22:00 from the database 106 in correspondence with the range key and transmits the read data to the portable terminal A-3 via the data communicator 105.

(Step S209)

The display 101 of the portable terminal A-3 displays the data having the provided range key of 2015-01-02-22:00 on its own display screen.

Figure 12:
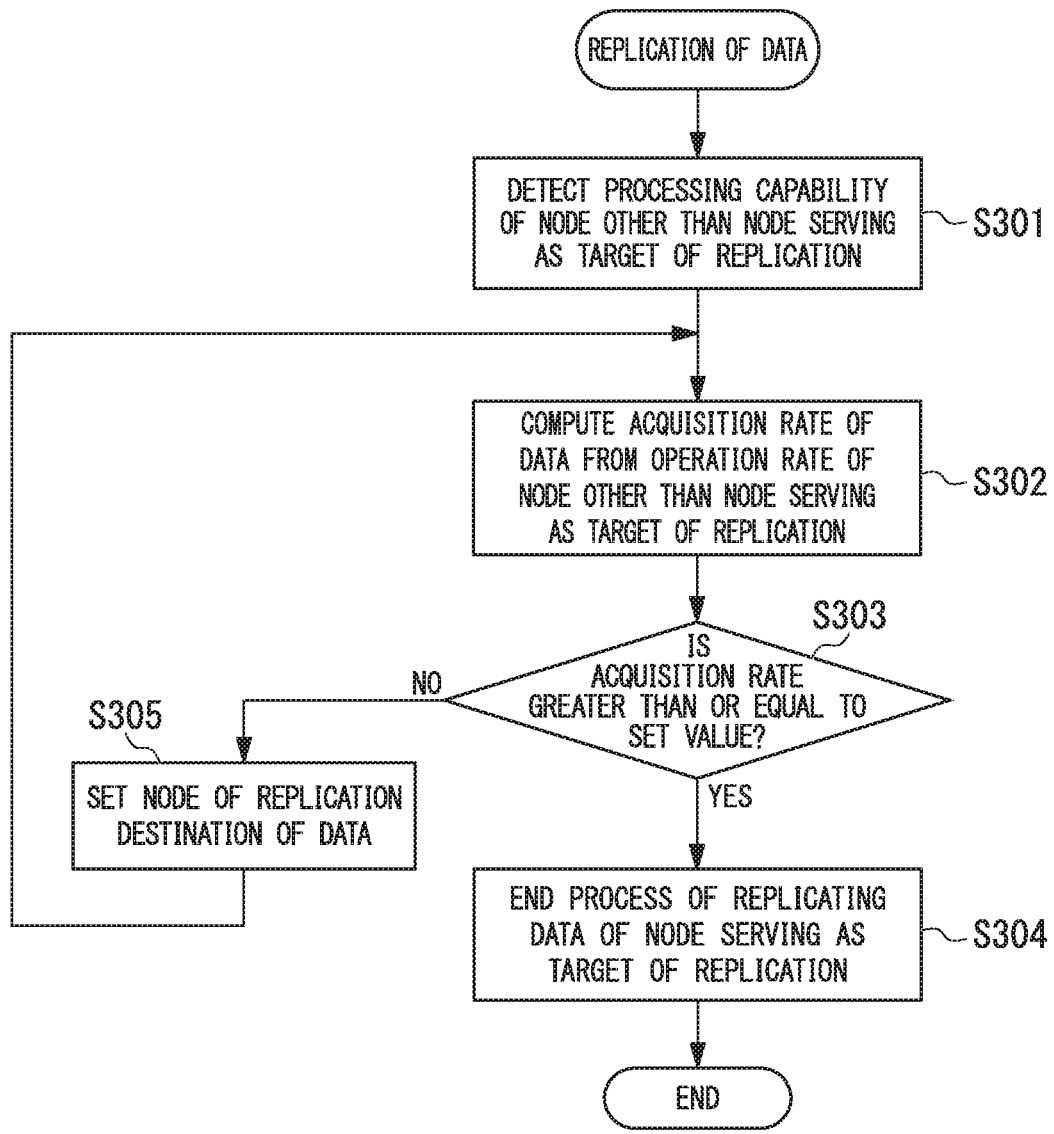
FIG. 12 is a flowchart illustrating an operation example of a process of creating a replication between nodes of the data management system 1.
Figure 13:
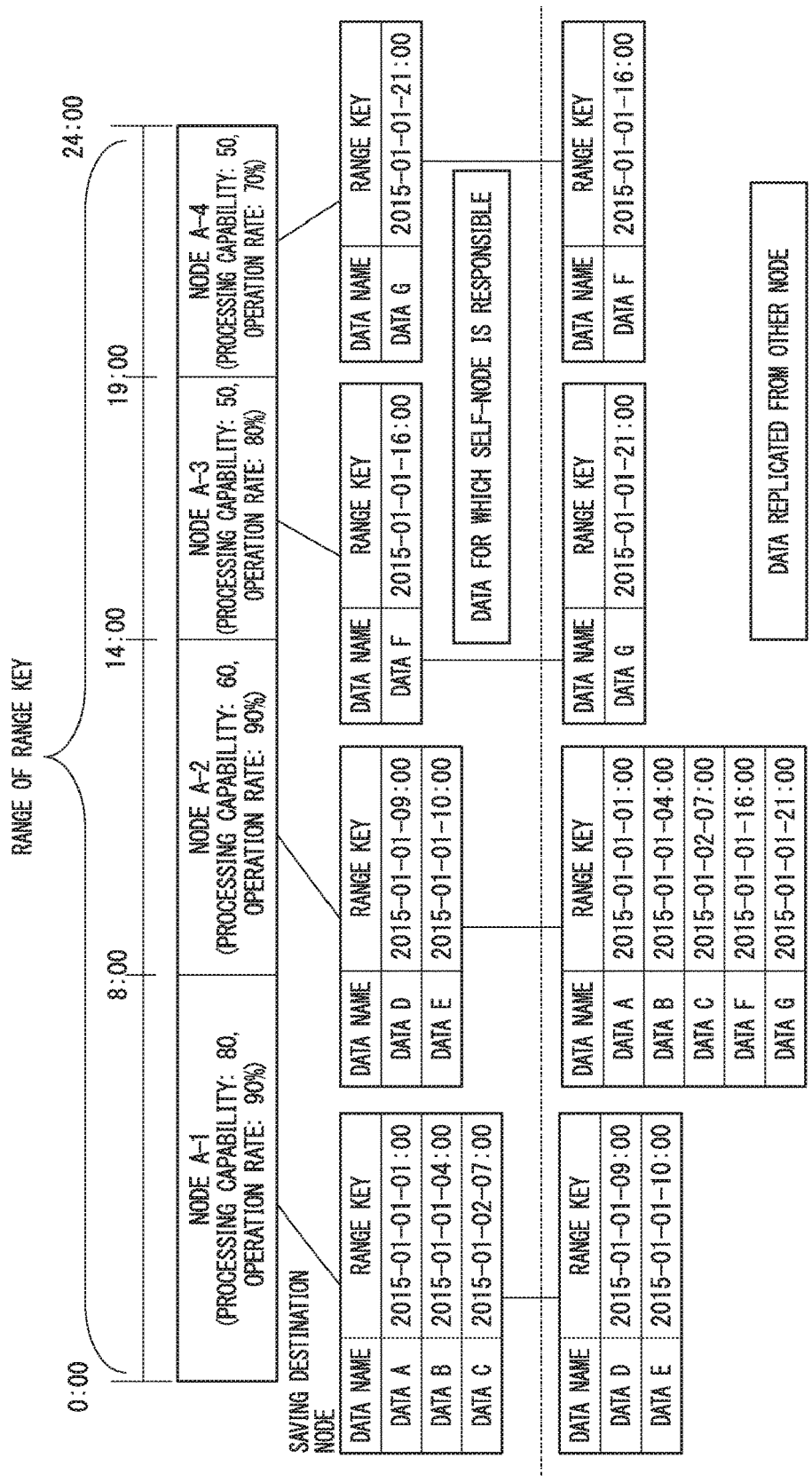
FIG. 13 is a diagram illustrating an operation example of a process of creating a replication between nodes of the data management system 1.

A process of replicating data to generate the replicated data in another node to read unreadable data from another node when a state in which no data is read from the node is reached will be described below using FIGS. 12 and 13. That is, an operation of optionally detaching the node from the network NW is assumed in this preferred embodiment. Because of this, data stored by the node to be detached may be lost without being read. Thus, data stored in the detached node is recovered in another node having the replication of the data and the data of the detached node is configured to be read in a node having the replication of the data of the detached node. FIG. 12 is a flowchart illustrating an operation example of a process of creating a replication between nodes of the data management system 1. FIG. 13 is a diagram illustrating an operation example of a process of creating a replication between nodes of the data management system 1.

Here, each of the server A-1, the personal computer A-2, and the portable terminals A-3 and A-4 is connected to the network NW and participates in the data management system 1 in FIG. 1. Also, the server A-1 has a processing capability of 80 and an operation rate of 90%. The personal computer A-2 has a processing capability of 60 and an operation rate of 90%. The portable terminal A-3 has a processing capability of 50 and an operation rate of 80%. The portable terminal A-4 has a processing capability of 50 and an operation rate of 80%.

In the following description, the case in which the node (server) A-1 designates another node (personal computer) A-2, another node (portable terminal) A-3, and another node (portable terminal) A-4 as targets for creating a replication will be described.

(Step S301)

The data analyzer 103 of the server A-1 reads participation node information from the database 106 and detects the processing capabilities of the personal computer A-2, and the portable terminals A-3 and A-4 which are the other nodes from the participation node information. The data analyzer 103 of the server A-1 computes a ratio of the processing capabilities of the personal computer A-2 (processing capability: 60), and the portable terminals A-3 (processing capability: 50) and A-4 (processing capability: 50) as 6:5:5. The data analyzer 103 of the server A-1 allocates an allocation time range of a range key to each of nodes other than a node for which a replication is desired to be performed.

At this time, when the data analyzer 103 of the server A-1 divides 24 hours according to a ratio of processing capabilities, an allocation time range of 9 hours is allocated to the personal computer A-2, an allocation time range of 7.5 hours is allocated to the portable terminal A-3, and an allocation time range of 7.5 is allocated to the portable terminal A-4. Thereby, the data analyzer 103 of the server A-1 causes the personal computer A-2 to hold a replication of data of the range key included in a time period from 00:00 to 09:00, causes the portable terminal A-3 to hold a replication of data of the range key included in a time period from 09:00 to 16:30, and causes the portable terminal A-4 to hold a replication of data of the range key included in a time period from 16:30 to 24:00.

(Step S302)

The data analyzer 103 of the server A-1 detects operation rates of the personal computer A-2 and the portable terminals A-3 and A-4 which are nodes other than its own node from the participation node information. The data analyzer 103 of the server A-1 computes an acquisition rate from an operation rate of a replication destination. Here, the data analyzer 103 of the server A-1 computes 1−(1−0.9)×(1−0.9)=0.99 (that is, 99%) by substituting its own operation rate and an operation rate of the personal computer A-2 into a formula of 1−(1−(operation rate of one side))×(1−(operation rate of other side)) using a probability that any one node operates as the acquisition rate from its own operation rate of 90% and an operation rate of 90% of the personal computer A-2 because a node for generating a replication of data having an allocation time range from 00:00 to 08:00 held by the server A-1 is the personal computer A2.

Also, when nodes for generating the replication of data are the personal computer A2 and the portable terminal A-3, the data analyzer 103 of the server A-1 computes 1−(1−0.9)×(1−0.9)×(1−0.8)=0.998 (that is, 99.8%) as the acquisition rate by substituting its own operation rate, an operation rate of the personal computer A-2, and an operation rate of the portable terminal A-3 into a formula of 1−(1−(operation rate of one side))×(1−(operation rate of other side))×(1−(operation rate of other side)).

(Step S303)

The data analyzer 103 of the server A-1 compares the acquisition rate obtained from the operation rate of its own node and the operation rate of the personal computer A2 which is a replication destination of data with a preset acquisition rate threshold value. When the acquisition rate is greater than or equal to the above-described acquisition rate threshold value which is a set value, the data analyzer 103 of the server A-1 moves the process to step S304. On the other hand, when the acquisition rate is less than the acquisition rate threshold value, the process moves to step S305. Here, the acquisition rate threshold value indicates a ratio at which data stored in a node serving as a target can be read and the user sets any numerical value in correspondence with importance of reading of data in a timely manner.

(Step S304)

Next, the data analyzer 103 of the server A-1 transmits a control signal indicating a replication instruction and its own held data to the node of the replication destination, for example, the personal computer A-2.

The node of the replication destination, for example, the data reader/writer 104 of the personal computer A-2, writes a replication of data to the database 106 to store the replication. At this time, the data reader/writer 104 of the personal computer A-2 assigns a replication flag, which indicates that data is a replication and its own node does not access and read the replication, for the replication of data. Also, at this time, the data reader/writer 104 of the personal computer A-2 attaches a node flag indicating a node of a replication to each piece of the replicated data to cause the data to be stored.

Alternatively, a configuration in which its own stored data is written to a data region and replicated data of another node is written to a replicated data region by separating the database 106 into the data region of its own stored data and the replicated data region for storing the replication of the data of the other node may be adopted. In this case, identification information indicating a node of a replication source of data is assigned to each replicated data region.

Through the above-described process, a process of replicating data of the server A-1 which is a node serving as a target of a replication in a node for holding the replication, for example, the personal computer A-2, ends.

(Step S305)

The data analyzer 103 of the server A-1 refers to participation node information to search for a node other than the personal computer A-2 and extract each of the portable terminals A-3 and A-4. Because the ratio of processing capabilities is 50:50=1:1, an allocation time range of 12 hours is set for the portable terminal A-3 and an allocation time range of 12 hours is set for the portable terminal A-4 when the data analyzer 103 of the server A-1 divides 24 hours at the ratio of processing capabilities. Thereby, the data analyzer 103 of the server A-1 causes the portable terminal A-3 to hold a replication of data of a range key included in a time period from 00:00 to 12:00 and causes the portable terminal A-4 to hold a replication of data of a range key included in a time period from 12:00 to 24:00. Here, because a range of its own stored range key is 00:00 to 8:00, the data analyzer 103 of the server A-1 selects and sets the portable terminal A-3 as a node responsible for a replication of data from 00:00 to 12:00. The data analyzer 103 of the server A-1 moves the process to step S302.

A process of recovering data so that data is read from another node using data of a replication generated in the other node when a state in which no data is read from a node is reached will be described below using FIGS. 14 and 15. That is, an operation of optionally detaching the node from the network NW is assumed in this preferred embodiment. As described above, data stored by the node to be detached may be lost without being read. Thus, data stored in the detached node (or a malfunction node) is recovered in another node having the replication of the data and the data of the detached node is configured to be read in a node having the replication.

Figure 14:
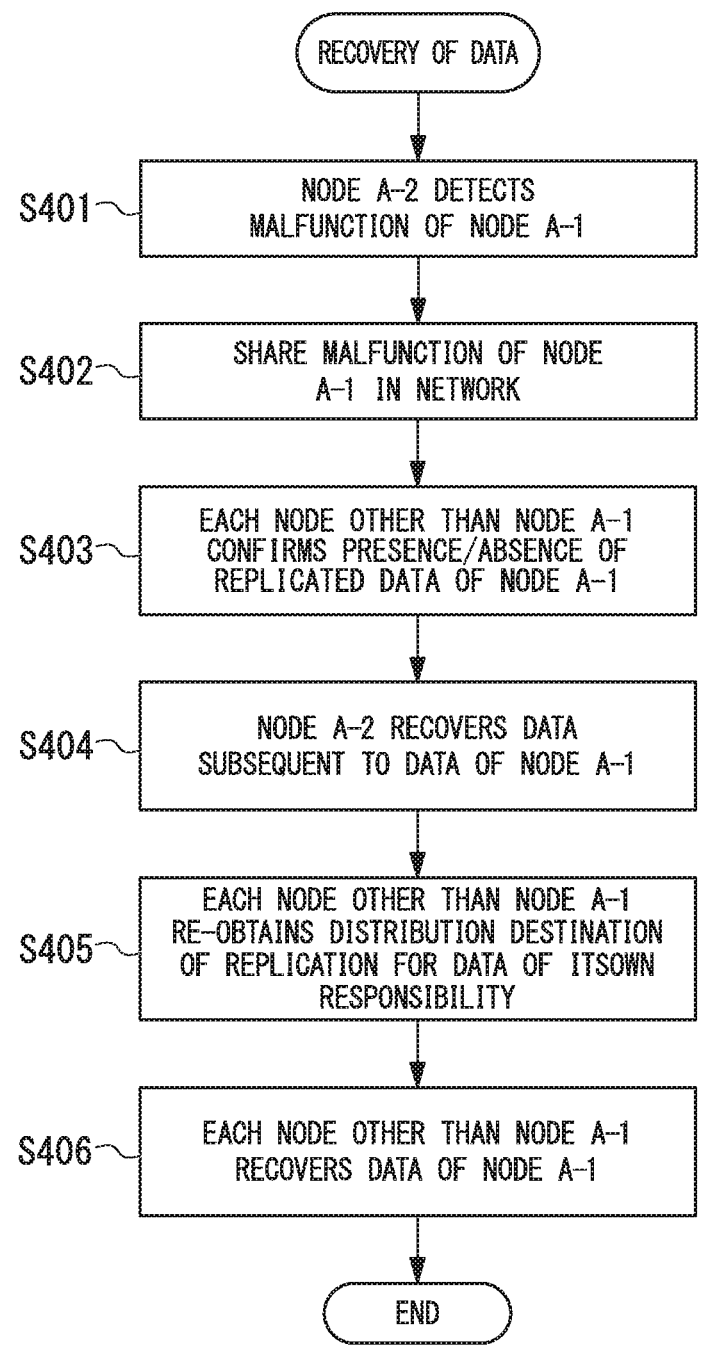
FIG. 14 is a flowchart illustrating an operation example of a process of recovering data from a replication between nodes of the data management system 1.
Figure 15:
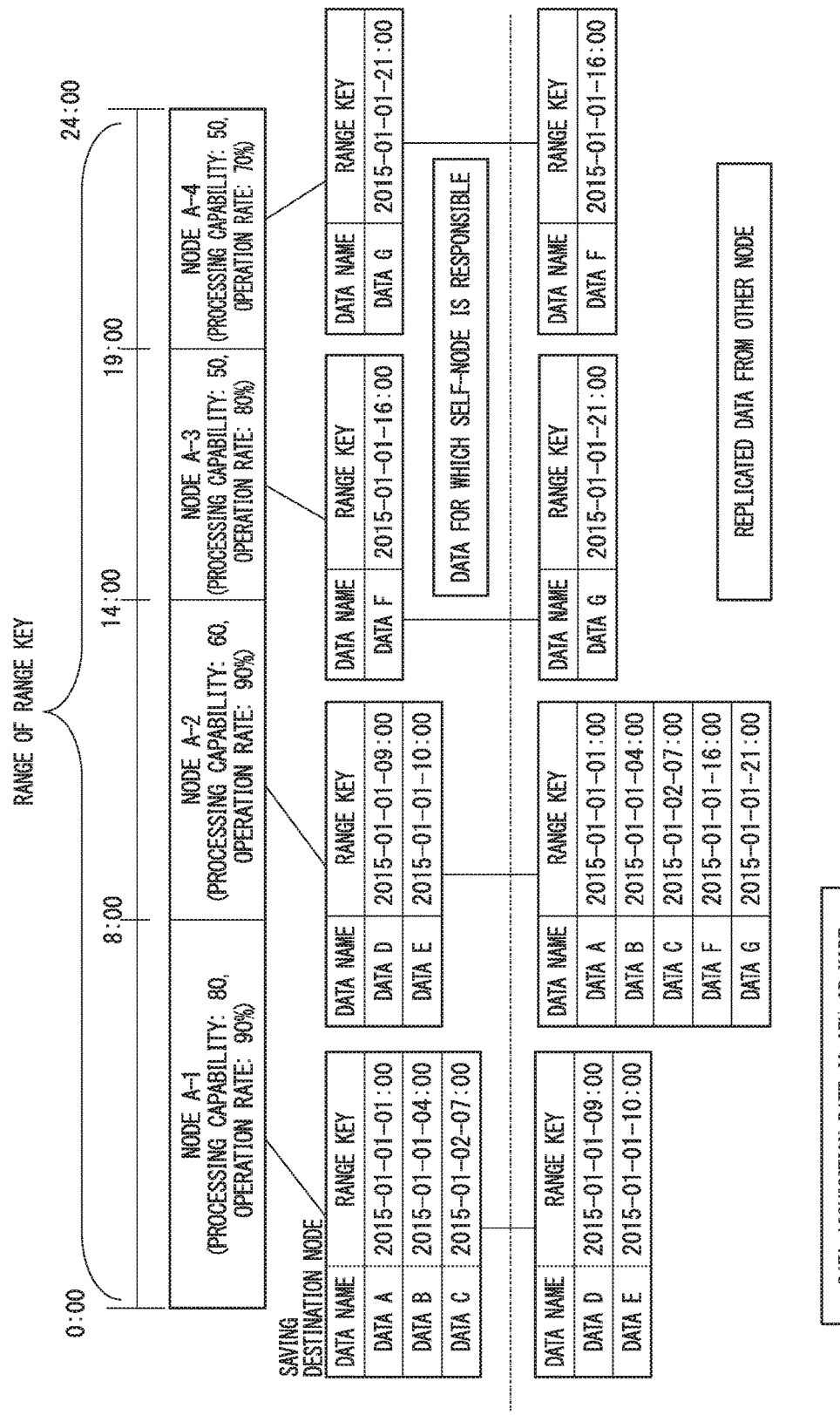
FIG. 15 is a diagram illustrating an operation example of a process of recovering unreadable data stored by a node from data of a replication between nodes of the data management system 1.

FIG. 14 is a flowchart illustrating an operation example of a process of recovering data from a replication between nodes of the data management system 1. FIG. 15 is a diagram illustrating an operation example of a process of recovering unreadable data stored by a node from data of a replication between nodes of the data management system 1.

Also, in this preferred embodiment, alive monitoring of each of nodes is performed and whether each node is alive or not is mutually checked according to heartbeat processing or the like between the nodes.

(Step S401)

The data analyzer 103 of the personal computer A-2, for example, detects that there is no response from the server A-1 and the server A-1 is in an unresponsive state (indicating a state according to whether the server A-1 is deviated from the network NW or malfunctions) according to the heartbeat processing.

(Step S402)

The data analyzer 103 of the personal computer A-2 outputs information indicating that the server A-1 is in the unresponsive state to all nodes connected to the network NW, that is, the server A-1 and nodes other than its own node in the participation node information.

Thereby, for example, each of the portable terminals A-3 and A-4 recognizes that the server A-1 is in the unresponsive state according to a notification from the personal computer A-2. At this time, each node may be configured to assign a flag indicating the unresponsive state to the server A-1 which is an unresponsive node of the participation node information.

According to the above-described process, the information indicating that the server A-1 is in the unresponsive state is shared in all nodes other than the server A-1 connected to the network NW, that is, the personal computer A-2 and the portable terminals A-3 and A-4.

(Step S403)

The data analyzer 103 of each node of the personal computer A-2 and the portable terminals A-3 and A-4 can obtain the allocation time range of the range key stored by the server A-1 according to an operation rate and processing capability as described above. The data analyzer 103 of each node of the personal computer A-2 and the portable terminals A-3 and A-4 checks the time of the range key of its own stored replication and determines whether a replication of data of the server A-1 is stored according to whether the checked time is included in the allocation time range of the server A-1.

Also, the data analyzer 103 of each node of the personal computer A-2 and the portable terminals A-3 and A-4 detects the presence/absence of data stored by the server A-1 of the unresponsive state according to the node flag assigned to the above-described replicated data or the identification information assigned to the replicated data region. For example, the data analyzer 103 of the personal computer A-2 detects that the replication of the data stored by the server A-1 is written to its own database 106 and stored.

(Step S404)

The data analyzer 103 of the personal computer A-2 recovers data A, data B, and data C of the server A-1 by designating its own stored data of replications of the data A, the data B, and the data C of the server A-1 stored in the personal computer A-2 as its own data. At this time, the data analyzer 103 of the personal computer A-2 recovers data by changing the node flag of the node assigned to the data A, the data B, and the data C to the node flag of the personal computer A-2. Alternatively, the data analyzer 103 of the personal computer A-2 recovers data by moving the replications of the data A, the data B, and the data C stored in the replicated data region to its own data region.

(Step S405)

Also, the data analyzer 103 of the node of each of the personal computer A-2 and the portable terminals A-3 and A-4 re-requests a distribution destination of a replication of its own data according to the flowchart of FIG. 12.

(Step S406)

The data analyzer 103 of each of the personal computer A-2 and the portable terminals A-3 and A-4 distributes data into the node of the obtained distribution destination.

Thereby, the entire data management system 1 is recovered by the data analyzer 103 of each of the personal computer A-2 and the portable terminals A-3 and A-4 while the acquisition rate of the data is greater than or equal to an acquisition rate threshold value.

As described above, because partition node information including information of a newly participating node between nodes and an index table can be shared when the new node is connected to the network NW according to this preferred embodiment, all nodes within the data management system 1 can share data of the newly participating node. Thereby, according to this preferred embodiment, a storage medium of a node optionally connectable to the network or detachable from the network can be effectively used in accumulation of data within the system.

Also, according to this preferred embodiment, it is unnecessary to perform data conversion via a specific node because a key-value store scheme is used and the same type of data is used in all nodes in the data management system 1. Thereby, according to this preferred embodiment, it is possible to refer to data stored in the data management system 1 from any one node connected to the network NW by accessing the node.

Also, according to this preferred embodiment, it is possible to optionally perform the connection and detachment of the node for the network NW because data is prevented from being lost (unread) even when any node is detached because data is shared among a plurality of nodes according to a replication. That is, because data of the new node is shared by a plurality of nodes when a node holding data to be managed in the data management system 1 is newly connected to the network NW, data of a node from which data is unreadable is prevented from being lost because the data of the node from which the data is unreadable is recovered in another node having a replication when one node storing data of the new node is detached or when any one node is in an unresponsive state due to a malfunction.

Second Preferred Embodiment

Figure 16:
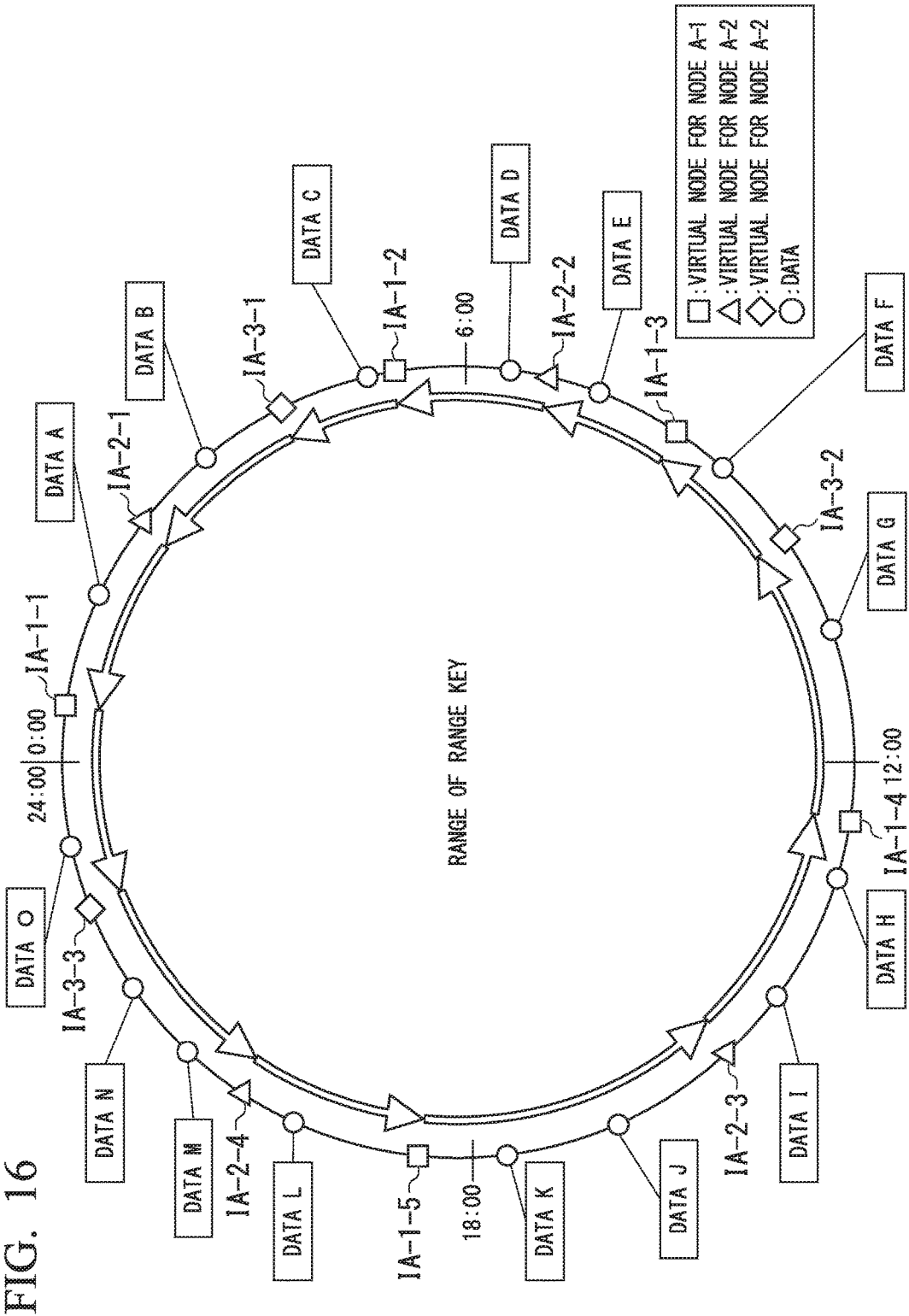
FIG. 16 is a diagram illustrating a hash function for mapping and arranging a time range between a minimum value and a maximum value of a range key on a circumference of a circle and arranging an allocation time range stored by each node as a hash value on the circumference of the circle (hereinafter referred to simply as the circumference) as a virtual node.

The configuration of the data management system 1 in the second preferred embodiment is similar to that of the first preferred embodiment and a different process will be described below. In the second preferred embodiment, the data analyzer 103 sets a node which is a saving destination of data by performing computation using a hash function according to a time in a range key through an algorithm of a consistent hashing method. The consistent hashing method in this preferred embodiment uses a virtual node as a hash value to prevent an amount of data to be handled by each node from being unequal according to a range key of the hash value. The virtual node represents a plurality of virtual nodes indicating the same node as an actual node. That is, in this preferred embodiment, as illustrated in FIG. 16, the data analyzer 103 creates allocation time ranges as a plurality of virtual nodes for one node and disperses the bias of an amount of data to be handled by each node by mapping and distributing the allocation time ranges on a time range of the range key. The data analyzer 103 of each node performs processes of computation of a hash value by a hash function serving as an allocation time range of a virtual node to be described below and selection of a node which creates a replication according to an algorithm of the consistent hashing method.

FIG. 16 is a diagram illustrating a hash function for mapping and arranging a time range between a minimum value and a maximum value of a range key on a circumference of a circle and arranging an allocation time range stored by each node as a hash value on the circumference of the circle (hereinafter referred to simply as the circumference) as a virtual node. In FIG. 16, the data analyzer 103 maps and arranges time ranges between 00:00 which is a minimum value and 24:00 which is a maximum value of the range key in the time range of the range key on a circumference by designating 00:00 and 24:00 as the same value. Also, the hash function in this preferred embodiment is output on the circumference on which the time range of the range key of FIG. 16 is shown using allocation time ranges corresponding to virtual nodes equal in number to processing capabilities of nodes as hash values.

FIG. 17 illustrates participation node information in which node information of a node connected to the network NW and participating in the data management system 1 is described. A record (a data column of a row direction) is formed for each node and corresponds to a node ID, and processing capability and an operation rate are stored. The node ID is information for identifying a node, and, for example, a code is used as the node ID in this preferred embodiment. The processing capability is determined by a size of capacity of the database 106 and a speed of writing of a node. The operation rate indicates a ratio of a time period in which the node is connected to the network NW and participates in the data management system 1 to a time period in which the data management system 1 operates. For example, an operation rate of the node constantly connected to the network NW is 100 and an operation rate of the node for which a time period of disconnection from the network NW is long and a time period of connection to the network NW is short is set to 10. In FIG. 17, the node A-1 has a processing capability of 100 and an operation rate of 90. Also, the node A-2 has a processing capability of 80 and an operation rate of 80. The node A-3 has a processing capability of 60 and an operation rate of 70.

FIG. 18 is a diagram illustrating an index table for describing correspondence between data used in the description of this preferred embodiment and a range key corresponding to the data. Data A to O is data measured at 2015-01-01-02:00, . . . , 2015-01-01-23:00. The data is measured between 00:00 and 24:00.

Returning to FIG. 16, a ratio of processing capabilities of the participating nodes A-1, A-2, and A-3 from a participation node table is 100:80:60=5:4:3. Thus, the hash function outputs virtual nodes for the node A-1 as five hash values, outputs virtual nodes for the node A-2 as four hash values, and outputs virtual nodes for the node A-3 as three hash values. In FIG. 16, the virtual nodes for the node A-1 are indicated by "□" symbol and are five nodes from a virtual node IA-1-1 to a virtual node IA-1-5. Also, the virtual nodes for the node A-2 are indicated by "Δ" symbol and are four virtual nodes from a virtual node IA-2-1 to a virtual node IA-2-4. The virtual nodes for the node A-3 are indicated by "◇" symbol and are three virtual nodes IA-3-1 to IA-3-3.

Data of a range key of a time between virtual nodes is stored in a node corresponding to an initial virtual node in a clockwise direction. For example, data A having a range key of 2015-01-01-02:00 between the virtual node IA-1-1 and the virtual node IA-2-1 is stored in the node A-2 corresponding to the virtual node IA-2-1. Likewise, data E having a range key of 2015-01-01-07:00 between the virtual node IA-2-2 and the virtual node IA-1-3 is stored in the node A-1 corresponding to the virtual node IA-1-3.

Returning to FIG. 1, selection of another node for creating a replication of its own stored data using the virtual node is performed in order of adjacency to virtual nodes for a replication source in a clockwise direction after excluding another virtual node corresponding to its own node using each of virtual nodes for a predetermined node as a node of a replication source. For example, the data analyzer 103 of the node A-1 selects the virtual node IA-2-1 for the adjacent node A-2 in the clockwise direction as a replication destination of data in an allocation time range corresponding to the virtual node IA-1-1 in the selection of the node for generating the replication. Thereby, data O of the node A-1 included in allocation time ranges of a virtual node IA-3-3 and a virtual node IA-1-1 is replicated in correspondence with an allocation time range of the virtual node IA-2-1 for the node A-2.

Also, the data analyzer 103 of the node A-1 selects a virtual node IA-2-2 for the adjacent node A-2 in the clockwise direction with respect to an allocation time range of its own node (virtual node IA-1-2) as a replication destination of data in an allocation time range corresponding to the virtual node IA-1-2 in the selection of the node for generating a replication. Thereby, data C of the node A-1 included in allocation time ranges of virtual nodes IA-3-1 and IA-1-2 is replicated in correspondence with the allocation time range of the virtual node IA-2-2 for the node A-2.

Likewise, the data analyzer 103 of the node A-1 selects a virtual node IA-3-2 for the adjacent node A-3 in the clockwise direction with respect to an allocation time range of its own node (virtual node IA-1-3) as a replication destination of data in an allocation time range corresponding to the virtual node IA-1-3 in the selection of the node for generating a replication. Thereby, data E of the node A-1 included in allocation time ranges of virtual nodes IA-2-2 and IA-1-3 is replicated in correspondence with the allocation time range of the virtual node IA-3-2 for the node A-3.

Also, the data analyzer 103 of the node A-1 selects a virtual node IA-2-3 for the adjacent node A-2 in the clockwise direction with respect to an allocation time range of its own node (virtual node IA-1-4) as a replication destination of data in an allocation time range corresponding to the virtual node IA-1-4 in the selection of the node for generating a replication. Thereby, data G of the node A-1 included in allocation time ranges of virtual nodes IA-3-2 and IA-1-4 is replicated in correspondence with the allocation time range of the virtual node IA-2-3 for the node A-2.

Likewise, the data analyzer 103 of the node A-1 selects a virtual node IA-2-4 for the adjacent node A-2 in the clockwise direction with respect to an allocation time range of its own node (virtual node IA-1-5) as a replication destination of data in an allocation time range corresponding to the virtual node IA-1-5 in the selection of the node for generating a replication. Thereby, data K and data J of the node A-1 included in allocation time ranges of virtual nodes IA-2-3 and IA-1-5 are replicated in correspondence with the allocation time range of the virtual node IA-2-4 for the node A-2.

Figure 19:
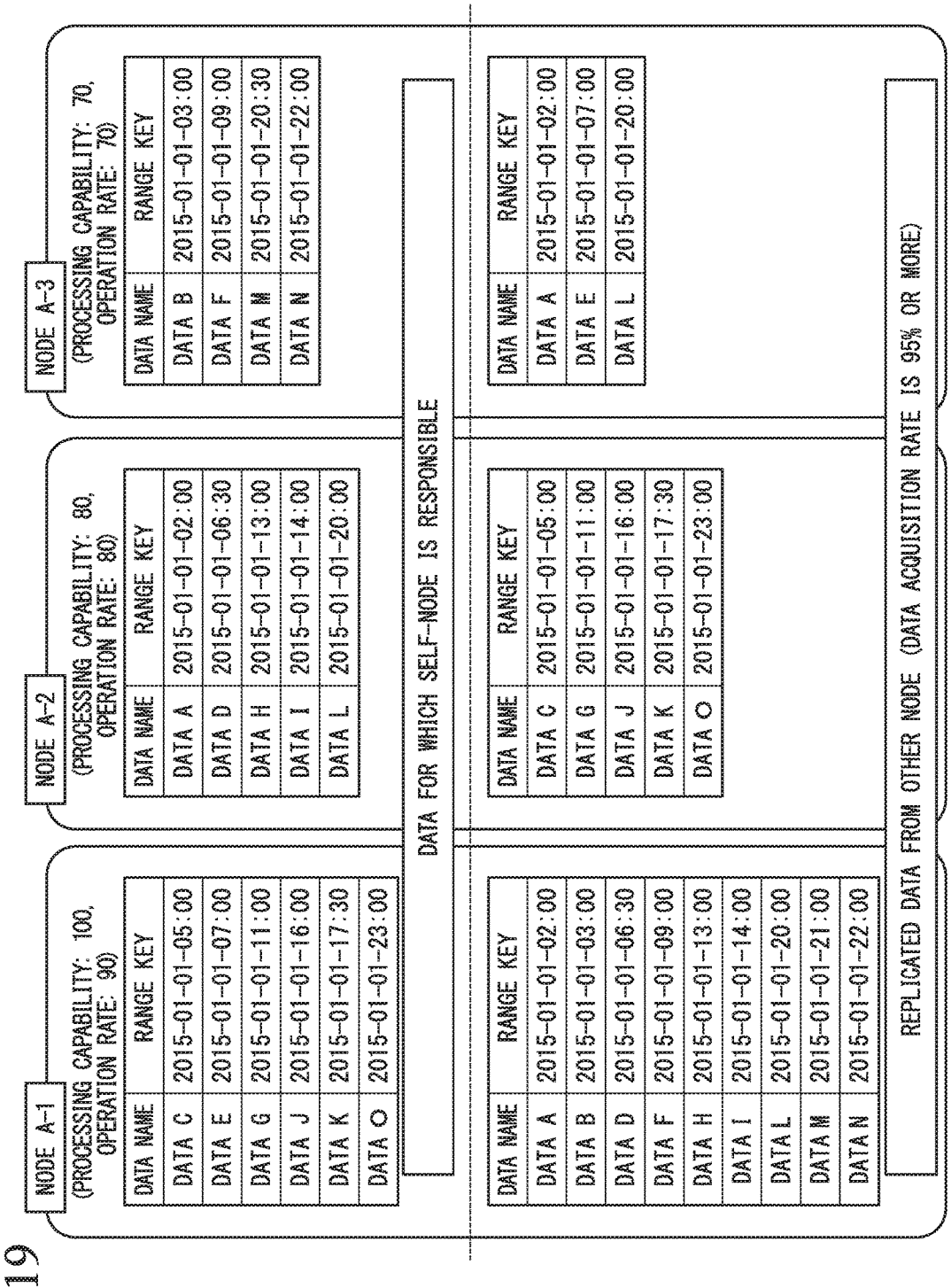
FIG. 19 is a diagram illustrating data stored in each of a node A-1, a node A-2, and a node A-3 and a replication destination of the data according to a consistent hashing method using a virtual node.

Through the above-described replication creation process, the data analyzer 103 of the node A-1 creates a replication of each of data C, data G, data J, data K, and data O within the data C, data E, the data G, the data J, the data K, and the data O stored in the node A-1 for the node A-2 and creates a replication of the data E for the node A-3 as illustrated in FIG. 19 to be described below. At this time, the data analyzer 103 of the virtual node A-1 computes an acquisition rate of data to be replicated in the node A-2 from an operation rate of each of the nodes A-1 and the node A-2 and determines whether the computed acquisition rate is greater than or equal to a preset acquisition rate threshold value as in the first preferred embodiment.

Here, the data analyzer 103 of the node A-1 obtains the acquisition rate from the operation rate of each of the node A-1 and the node A-2 as 1−(1−0.9)×(1−0.8)=0.98 (that is, 98%). Because the acquisition rate is 98% and the acquisition rate threshold value is 95% or more, the data analyzer 103 of the node A-1 sets a creation destination of a replication of each of data C, data G, data J, data K, and data O to only the node A-2. Also, likewise, the data analyzer 103 of the node A-1 obtains an acquisition rate as 1−(1−0.9)×(1−0.7)=0.97 (that is, 97%) from an operation rate of each of the node A-1 and the node A-3. Because the acquisition rate is 97% and the acquisition rate threshold value is 95% or more, the data analyzer 103 of the node A-1 sets a creation destination of a replication of data E to only the node A-3.

FIG. 19 is a diagram illustrating data stored in each of the node A-1, the node A-2, and the node A-3 and a replication destination of the data according to a consistent hashing method using a virtual node. It is shown that data C, data G, data J, data K, and data O within the data C, data E, the data G, the data J, the data K, and the data O stored in the database 106 of the node A-1 are replicated for the node A-2 and the data C is replicated in the node A-3. Also, it is shown that data A and data L within the data A, data D, data H, data I, and the data L stored in the database 106 of the node A-2 are replicated in the node A-3 and the data A, the data D, the data H, the data I, and the data L are replicated in the node A-2. Also, all of data B, data F, data M, and data N stored in the database 106 of the node A-3 are shown to be replicated in the node A-1.

Returning to FIG. 16, the data analyzer 103 of the node A-2 selects a virtual node IA-3-1 for the adjacent node A-3 in a clockwise direction for an allocation time range of its own node (virtual node IA-2-1) as a replication destination of the data in the allocation time range corresponding to the virtual node IA-2-1 in selection of the node for generating the replication. Thereby, data A of the node A-2 included in allocation time ranges of virtual nodes IA-1-1 and IA-2-1 is replicated in correspondence with the allocation time range of the virtual node IA-3-1 for the node A-3.

Likewise, the data analyzer 103 of the node A-2 selects a virtual node IA-1-3 for the adjacent node A-1 in the clockwise direction for an allocation time range of its own node (virtual node IA-2-2) as a replication destination of the data in the allocation time range corresponding to the virtual node IA-2-2 in selection of the node for generating the replication. Thereby, data D of the node A-2 included in allocation time ranges of virtual nodes IA-1-2 and IA-2-2 is replicated in correspondence with the allocation time range of the virtual node IA-1-3 for the node A-1.

Also, the data analyzer 103 of the node A-2 selects a virtual node IA-1-5 for the adjacent node A-1 in the clockwise direction for an allocation time range of its own node (virtual node IA-2-3) as a replication destination of the data in the allocation time range corresponding to the virtual node IA-2-3 in selection of the node for generating the replication. Thereby, data H and data I of the node A-2 included in allocation time ranges of virtual nodes IA-1-4 and IA-2-3 are replicated in correspondence with the allocation time range of the virtual node 1A-1-5 for the node A-1.

Likewise, the data analyzer 103 of the node A-2 selects a virtual node IA-3-3 for the adjacent node A-3 in the clockwise direction for an allocation time range of its own node (virtual node IA-2-4) as a replication destination of the data in the allocation time range corresponding to the virtual node IA-2-4 in selection of the node for generating the replication. Thereby, data L of the node A-2 included in allocation time ranges of virtual nodes 1A-1-5 and IA-2-4 is replicated in correspondence with the allocation time range of the virtual node IA-3-3 for the node A-3.

Through the above-described replication creation process, the data analyzer 103 of the node A-2 creates a replication of each of data A and data L within the data A, data D, data H, data I, and the data L stored in the node A-2 for the node A-3 and creates replications of the data A, the data D, the data H, the data I, and the data L for the node A-3 as illustrated in FIG. 19. At this time, the data analyzer 103 of the virtual node A-2 computes an acquisition rate of data to be replicated in the node A-3 from an operation rate of each of the node A-2 and the node A-3 and determines whether the computed acquisition rate is greater than or equal to a preset acquisition rate threshold value as in the first preferred embodiment.

Here, the data analyzer 103 of the node A-2 obtains the acquisition rate from the operation rate of each of the node A-2 and the node A-3 as 1−(1−0.8)×(1−0.7)=0.94 (that is, 94%). Because the acquisition rate is 94% and the acquisition rate threshold value is less than 95%, the data analyzer 103 of the node A-1 sets the next adjacent node A-1 as a creation destination of a replication of each of the data A and the data L. Thereby, the data analyzer 103 of the node A-2 re-computes the acquisition rates of the data A and the data L and obtains the acquisition rates as 1−(1−0.8)×(1−0.7)×(1−0.9)=0.994 (that is, 99.4%). Thereby, because the acquisition rate of each of the data A and the data L is 95% or more, the data analyzer 103 of the node A-2 selects the node A-3 and the node A-1 as the replication destinations of the data A and the data L, respectively. Here, the data L is also replicated in correspondence with an allocation time range of the virtual time range of the virtual node IA-1-1 for the next adjacent node A-1.

Also, likewise, the data analyzer 103 of the node A-2 obtains the acquisition rate from the operation rate of each of the node A-1 and the node A-2 as 1−(1−0.8)×(1−0.9)=0.98 (that is, 98%). Because the acquisition rate is 98% and the acquisition rate threshold value is 95% or more, the data analyzer 103 of the node A-1 sets a creation destination of a replication of each of the data D, the data H, and the data I to only the node A-1.

Also, the data analyzer 103 of the node A-3 selects a virtual node IA-1-2 for the adjacent node A-1 in the clockwise direction for an allocation time range of its own node (virtual node IA-3-1) as a replication destination of the data in the allocation time range corresponding to the virtual node IA-3-1 in selection of the node for generating the replication. Thereby, data C of the node A-3 included in allocation time ranges of virtual nodes IA-2-1 and IA-3-1 is replicated in correspondence with the allocation time range of a virtual node IA-2-2 for the node A-1.

Likewise, the data analyzer 103 of the node A-3 selects a virtual node IA-1-4 for the adjacent node A-1 in the clockwise direction for an allocation time range of its own node (virtual node IA-3-2) as a replication destination of the data in the allocation time range corresponding to the virtual node IA-3-2 in selection of the node for generating the replication. Thereby, data F of the node A-3 included in allocation time ranges of virtual nodes IA-2-2 and IA-3-2 is replicated in correspondence with the allocation time range of the virtual node IA-1-4 for the node A-1.

Also, the data analyzer 103 of the node A-3 selects a virtual node IA-1-1 for the adjacent node A-1 in the clockwise direction for an allocation time range of its own node (virtual node IA-3-3) as a replication destination of the data in the allocation time range corresponding to the virtual node IA-3-3 in selection of the node for generating the replication. Thereby, each of data M and data N of the node A-3 included in allocation time ranges of virtual nodes IA-2-4 and IA-3-3 is replicated in correspondence with the allocation time range of the virtual node IA-1-1 for the node A-1.

The data analyzer 103 of the node A-3 obtains the acquisition rate from the operation rate of each of the node A-3 and the node A-1 as 1−(1−0.9)×(1−0.7)=0.97 (that is, 97%). Because the acquisition rate is 97% and the acquisition rate threshold value is 95% or more, the data analyzer 103 of the node A-1 sets a creation destination of a replication of each of data B, data F, data M, and data N to only the node A-1.

Figure 20:
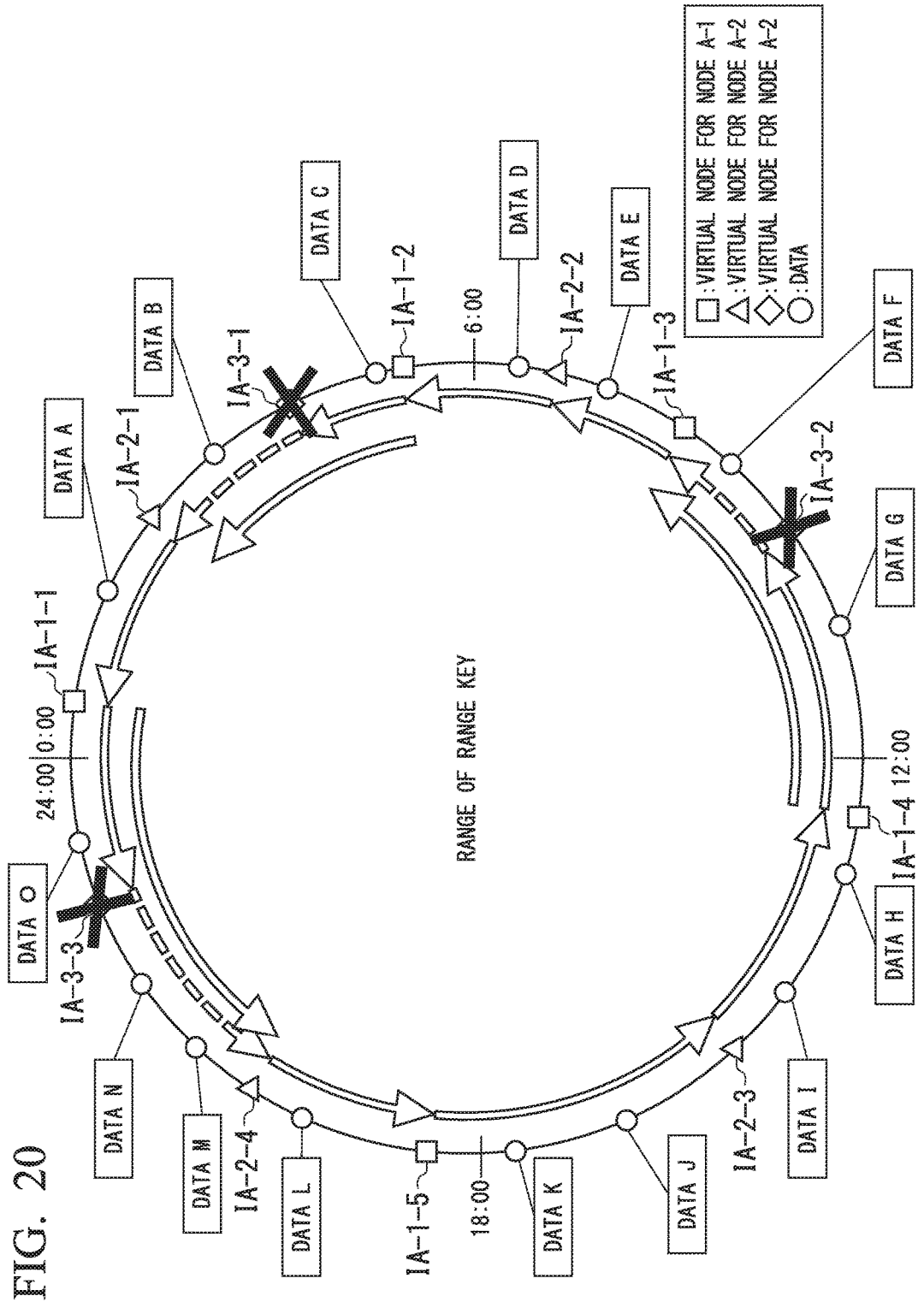
FIG. 20 is a diagram illustrating recovery of data stored in the node A-3 when the node A-3 is in an unresponsive state in a virtual node arranged by mapping the time range between the minimum value and the minimum value of the range key on the circumference.

FIG. 20 is a diagram illustrating recovery of data stored in the node A-3 when the node A-3 is in an unresponsive state in a virtual node arranged by mapping the time range between the minimum value and the minimum value of the range key on the circumference. In FIG. 20, the virtual nodes for the node A-1 are indicated by "□" symbol and are five nodes from a virtual node IA-1-1 to a virtual node IA-1-5. Also, the virtual nodes for the node A-2 are indicated by "△" symbol and are four virtual nodes from a virtual node IA-2-1 to a virtual node IA-2-4. The virtual nodes for the node A-3 are indicated by "◇" symbol and are three virtual nodes IA-3-1 to IA-3-3.

In FIG. 20, data of the node A-3 in the node A-1 in which a replication of data of the node A-3 is generated is replicated when the node A-3 malfunctions or is detached and there is no response from the node A-3 to an inquiry from another node of the network NW. That is, because a corresponding allocation time range of the virtual node IA-1-2 changes to include an allocation time range of the virtual node IA-3-1, data B of the node 3 in allocation time ranges of the virtual nodes IA-2-1 and the virtual node IA-3-1 becomes data stored by the node A-1. The allocation time range corresponding to the virtual node IA-1-2 becomes an allocation time range from the virtual node IA-2-1 to the virtual node IA-1-2 by adding an allocation time range from the virtual node IA-2-1 to the virtual node IA-3-1 to an allocation time range from the virtual node A-3-1 to the virtual node IA-1-2. Thereby, the node A-1 changes the data B from a replication of the node A-3 to its own data as in the first preferred embodiment.

Also, because a corresponding allocation time range of the virtual node IA-1-4 changes to include an allocation time range of the virtual node IA-3-2, data F of the node 3 in allocation time ranges of the virtual nodes IA-1-3 and the virtual node IA-3-2 becomes data stored by the node A-1. The allocation time range corresponding to the virtual node IA-1-4 becomes an allocation time range from the virtual node IA-1-3 to the virtual node IA-1-4 by adding an allocation time range from the virtual node IA-1-3 to the virtual node IA-3-2 to an allocation time range from the virtual node A-3-2 to the virtual node IA-1-4. Thereby, the node A-1 changes the data F from a replication of the node A-3 to its own data.

Also, because a corresponding allocation time range of the virtual node IA-1-1 changes to include an allocation time range of the virtual node IA-3-3, each of data M and data N of the node 3 in allocation time ranges of the virtual nodes IA-2-4 and the virtual node IA-3-3 becomes data stored by the node A-1. The allocation time range corresponding to the virtual node IA-1-1 becomes an allocation time range from the virtual node IA-2-4 to the virtual node IA-1-1 by adding an allocation time range from the virtual node IA-2-4 to the virtual node IA-3-3 to an allocation time range from the virtual node A-3-3 to the virtual node IA-1-1. Thereby, the node A-1 changes each of the data M and the data N from a replication of the node A-3 to its own data.

Figure 21:
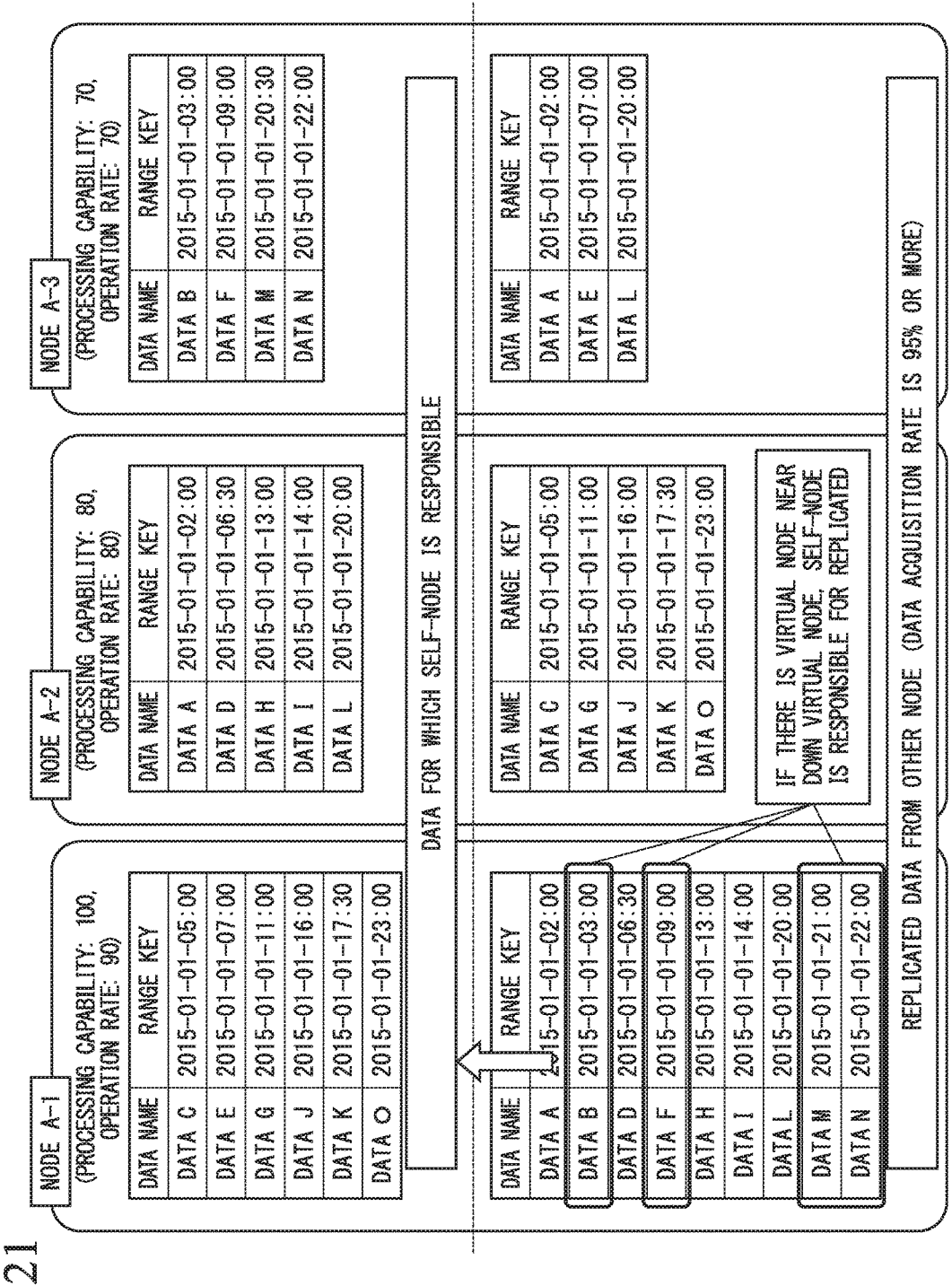
FIG. 21 is a diagram illustrating a process in which the node A-1 recovers data of the node A-3 from a replication of the data of the node A-3 when the node 3 is down.

FIG. 21 is a diagram illustrating a process in which the node A-1 recovers data of the node A-3 from a replication of the data of the node A-3 when the node 3 is in an unresponsive state. As illustrated in FIG. 21, replications of data A, data D, data H, data I, and data L of the node 2 and replications of data B, data F, data M, and data N of the node 3 are stored in the node A-1 in addition to data C, data E, data G, data J, data K, and data O to be managed by the node A-1.

When it is confirmed that there is no response from the node 3 to an inquiry of whether or not the node 3 is alive, the data analyzer 103 of the node A-1 recovers each of the data B, the data F, the data M, and the data N of the node 3 by changing a replication of each of the data B, the data F, the data M, and the data N of the node 3 to data for which the data analyzer 103 of the node A-1 is responsible.

Figure 22:
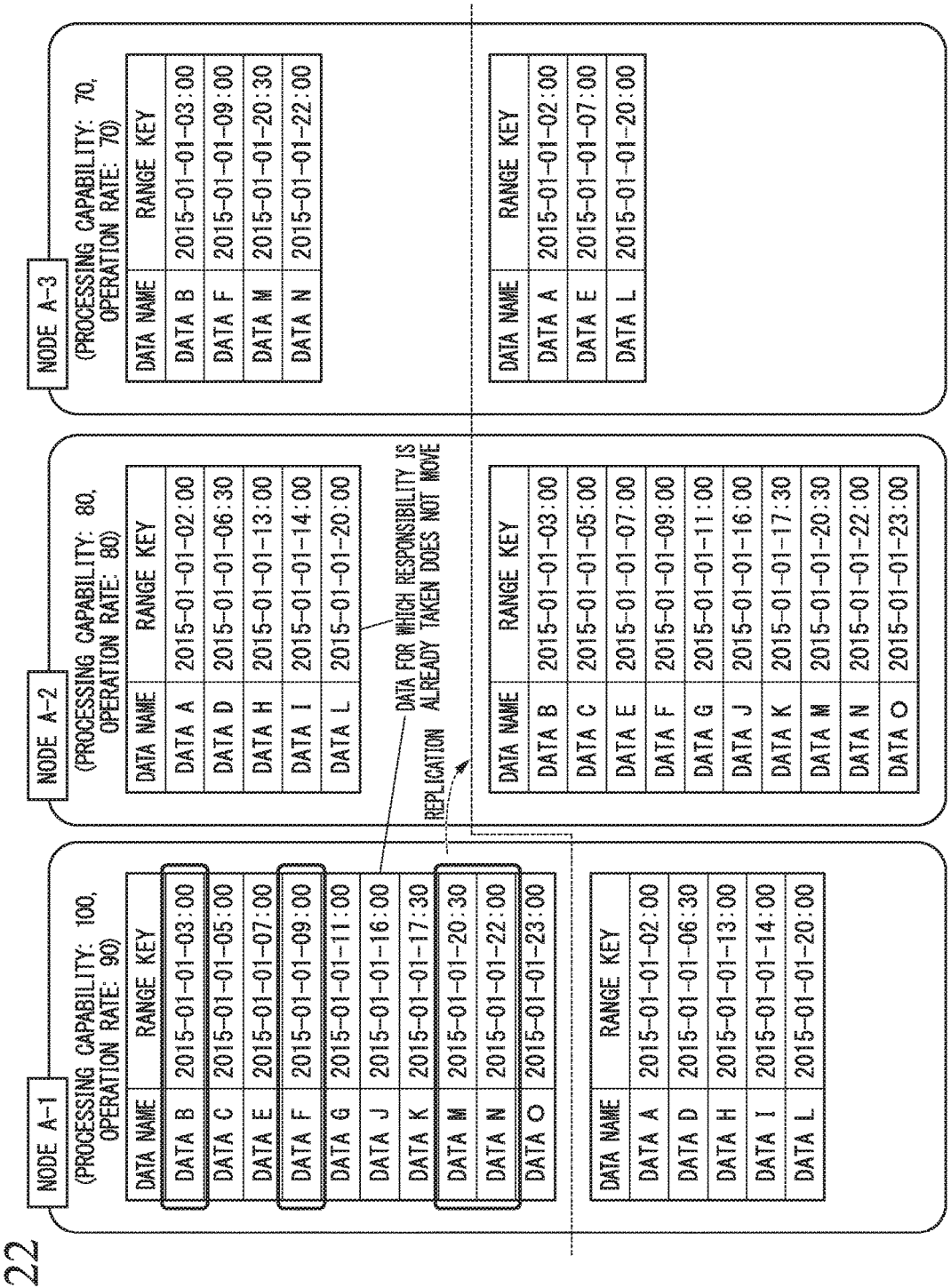
FIG. 22 is a diagram illustrating a process in which the node A-1 creates a replication of data for which responsibility is newly taken for another node after changing a replication of data of the node A-3 to data of its own responsibility.

FIG. 22 is a diagram illustrating a process in which the node A-1 creates a replication of data for which responsibility is newly taken for another node after changing a replication of data of the node A-3 to data of its own responsibility. The data analyzer 103 of the node A-1 generates a replication of each of data B, data F, data M, and data N serving as new data of its own responsibility in the node A-2.

That is, the data analyzer 103 of the node A-1 selects a virtual node IA-2-1 for the node A-2 adjacent in the clockwise direction as a replication destination of data in an allocation time range corresponding to a virtual node IA-1-1 in selection of the node for generating the replication. Thereby, each of data M and data N of the node A-1 included in allocation time ranges of virtual nodes IA-2-4 and IA-3-3 is replicated in correspondence with the allocation time range of the virtual node IA-2-1 for the node A-2.

Also, the data analyzer 103 of the node A-1 selects a virtual node IA-2-2 for the adjacent node A-2 in the clockwise direction for an allocation time range of its own node (virtual node IA-1-2) as a replication destination of the data in the allocation time range corresponding to the virtual node IA-1-2 in selection of the node for generating the replication. Thereby, data B of the node A-1 included in allocation time ranges of virtual nodes IA-2-1 and IA-3-1 is replicated in correspondence with the allocation time range of the virtual node IA-2-2 for the node A-2.

Likewise, the data analyzer 103 of the node A-1 selects a virtual node IA-2-3 for the adjacent node A-2 in the clockwise direction for an allocation time range of its own node (virtual node IA-1-4) as a replication destination of the data in the allocation time range corresponding to the virtual node IA-1-4 in selection of the node for generating the replication. Thereby, data F of the node A-1 included in allocation time ranges of virtual nodes IA-1-3 and IA-3-2 is replicated in correspondence with the allocation time range of the virtual node IA-2-3 for the node A-2.

The data analyzer 103 of the node A-1 obtains the acquisition rate from the operation rate of each of the node A-1 and the node A-2 as 1−(1−0.9)×(1−0.8)=0.98 (that is, 98%). Because the acquisition rate is 98% and the acquisition rate threshold value is 95% or more, the data analyzer 103 of the node A-1 sets a creation destination of a replication of each of data B, data F, data M, and data N to only the node A-2.

Also, the data analyzer 103 of each of the node A and the node B does not perform a process of generating a replication for another node on each piece of data for which responsibility is already taken. Also, the data analyzer 103 of each of the node A and the node B can detect that the node in which data for which the node is responsible is recovered is an adjacent node in the clockwise direction for its own allocation time range through a history of a node in an unresponsive state and easily obtain an access destination of data of the node in the unresponsive state.

As described above, because partition node information including information of a newly participating node between nodes and an index table can be shared when the new node is connected to the network NW according to this preferred embodiment, all nodes within the data management system 1 can share data of the newly participating node. Thereby, according to this preferred embodiment, a storage medium of a node optionally connectable to the network or detachable from the network can be effectively used in accumulation of data within the system.

Also, according to this preferred embodiment, it is unnecessary to perform data conversion via a specific node because a key-value store scheme is used and the same type of data is used in all nodes in the data management system 1. Thereby, according to this preferred embodiment, it is possible to refer to data stored in the data management system 1 from any one node connected to the network NW by accessing the node.

Also, according to this preferred embodiment, it is possible to optionally perform the connection and detachment of the node for the network NW because data is prevented from being lost (unread) even when any node is detached because data is shared among a plurality of nodes according to a replication. That is, because data of the new node is shared by a plurality of nodes when a node holding data to be managed in the data management system 1 is newly connected to the network NW, data of a node from which data is unreadable is prevented from being lost because the data of the node from which the data is unreadable is recovered in another node having a replication when one node storing data of the new node is detached or when any one is in an unresponsive state due to malfunction.

Also, in this preferred embodiment, a hash function for generating a plurality of virtual nodes for one node is used and the virtual nodes for each node are arranged on a circumference of a circle in which a maximum value and a minimum value of a range key are connected in a circular pattern. Selection of another node for creating a replication of its own stored data is performed in order of adjacency to virtual nodes for a replication source in a clockwise direction after excluding another virtual node corresponding to its own node using each of virtual nodes for a predetermined node as a node of a replication source. Thereby, according to this preferred embodiment, it is possible to minimize a load applied to a process of moving data when data is recovered or moved if the number of nodes connected to the network NW increases or decreases.

Also, a data managing process may be executed by recording a program for implementing the functions of the data manager 10 of FIG. 2 in the present invention on a computer-readable recording medium and causing a computer system to read and execute the program recorded on the recording medium. Also, the "computer system" used here is assumed to include an operating system (OS) and hardware such as peripheral devices.

Also, the computer system is assumed to include a World Wide Web (WWW) system having a homepage providing environment (or displaying environment). In addition, the "computer-readable recording medium" refers to a storage apparatus including a flexible disk, a magneto-optical disc, a read only memory (ROM), or a portable medium such as a compact disc (CD)-ROM, and a hard disk embedded in the computer system. Furthermore, the "computer-readable recording medium" is assumed to include a medium that holds a program for a constant period of time, such as a volatile memory (random access memory (RAM)) inside a computer system serving as a server or a client when the program is transmitted via a network such as the Internet or a communication circuit such as a telephone circuit.

Also, the above-described program may be transmitted from a computer system storing the program in a storage apparatus or the like via a transmission medium or transmitted to another computer system by transmission waves in a transmission medium. Here, the "transmission medium" for transmitting the program refers to a medium having a function of transmitting information, such as a network (communication network) like the Internet or a communication circuit (communication line) like a telephone circuit. Also, the above-described program may be a program for implementing some of the above-described functions. Further, the above-described program may be a program, i.e., a so-called differential file (differential program), capable of implementing the above-described function in combination with a program already recorded on the computer system.

As used herein, the following directional terms "forward, rearward, above, downward, right, left, vertical, horizontal, below, transverse, row and column" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A data management system comprising a plurality of nodes to be connected to and disconnected from a network, wherein at least one of the plurality of nodes comprises one or more processors and one or more memories for implementing:
   a communicator that performs a communication via the network by using data having a data structure including a key;
   a database that accumulates the data; and
   a data analyzer that, when the node is newly connected to the network, provides another node already connected to the network with node information, the node information being used for enabling the node to serve as node for accumulating the data,
   wherein the key includes a time at which the accumulated data was measured, and the node information includes processing capability and an operation rate of the node,
   wherein the data analyzer selects the node of the operation rate greater than or equal to a predetermined threshold value as a node for saving the accumulated data and sets an allocation time range for allocating the accumulated data according to a measured time for each selected node by dividing a time range indicating a range of a time at which the accumulated data is measured in correspondence with the processing capability, and
   wherein the data analyzer sets the allocation time range of a node having high processing capability to be longer than the allocation time range of a node having low processing capability.

2. The data management system according to claim 1, wherein the node information is used to extract the node in which writing and reading of the data are performed.

3. The data management system according to claim 1, wherein the data analyzer extracts the node to which the accumulated data is written or from which the accumulated data is read according to a key of the accumulated data of a write or read target and node information of each of the nodes at the time of connecting to the network to write the accumulated data to each of the nodes within the network to accumulate the written data or read the accumulated data from each node.

4. The data management system according to claim 1, wherein the data analyzer replicates the accumulated data accumulated in the node for another node.

5. The data management system according to claim 4, wherein the data analyzer computes an acquisition rate of data on the basis of an operation rate of each of the node and the other node when the data is replicated and further replicates the accumulated data of the node in another node different from the other node until the acquisition rate becomes a preset value.

6. The data management system according to claim 4, wherein the data analyzer maps a time included in the time range to a circumference of a circle according to an algorithm of a consistent hashing method, maps the allocation time range of a hash value corresponding to the node to the circumference in correspondence with the time according to a hash function serving as the hash value corresponding to the allocation time range of each of the nodes, and sequentially generates replicated data which is a replication of its own accumulated data from the allocation time range of another adjacent node on the circumference.

7. The data management system according to claim 6, wherein the data analyzer computes hash values equal in number to processing capabilities of the nodes according to the hash function and designates an allocation time range of a virtual node by mapping the hash values to the circumference and distributing the mapped hash values in an allocation time range obtained by dividing the time range by a total value of the hash values of the nodes mapped to the circumference.

8. The data management system according to claim 4, wherein, when the reading of the node is not performed, the data analyzer of the other node recovers the accumulated data of the node from the replicated data of the accumulated data of the node stored by its own node and designates unreadable accumulated data of the node as its own accumulated data.

9. A data management method of accumulating data by distributing the data to a plurality of nodes connected to a network using a data structure corresponding to a key for a network system which operates to be able to connect a node to the network or detach the node from the network, at least one of the plurality of nodes comprising one or more processors and one or more memories for implementing the data management method,
   the data management method comprising a data analysis process in which, when the node is newly connected to the network, a data analyzer of the node provides another node already connected to the network with node information, the node information being used for enabling the node to serve as node for accumulating the data,
   wherein the key includes a time at which the accumulated data was measured, and the node information includes processing capability and an operation rate of the node, and
   wherein the data management method further comprises:
   a process in which the data analyzer selects the node of the operation rate greater than or equal to a predetermined threshold value as a node for saving the accumulated data and sets an allocation time range for allocating the accumulated data according to a measured time for each selected node by dividing a time range indicating a range of a time at which the accumulated data is measured in correspondence with the processing capability; and
   a process in which the data analyzer sets the allocation time range of a node having high processing capability to be longer than the allocation time range of a node having low processing capability.

10. The data management method according to claim 9, wherein the node information is used to extract the node in which writing and reading of the data are performed.

11. The data management method according to claim 9, further comprising a process in which the data analyzer extracts the node to which the accumulated data is written or from which the accumulated data is read according to a key of the accumulated data of a write or read target and node information of each of the nodes at the time of connecting to the network to write the accumulated data to each of the nodes within the network to accumulate the written data or read the accumulated data from each node.

12. The data management method according to claim 9, further comprising a process in which the data analyzer replicates the accumulated data accumulated in the node for another node.

13. The data management method according to claim 12, further comprising a process in which the data analyzer computes an acquisition rate of data on the basis of an operation rate of each of the node and the other node when the data is replicated and further replicates the accumulated data of the node in another node different from the other node until the acquisition rate becomes a preset value.

14. The data management method according to claim 12, further comprising a process in which the data analyzer maps a time included in the time range to a circumference of a circle according to an algorithm of a consistent hashing method, maps the allocation time range of a hash value corresponding to the node to the circumference in correspondence with the time according to a hash function serving as the hash value corresponding to the allocation time range of each of the nodes, and sequentially generates replicated data which is a replication of its own accumulated data from the allocation time range of another adjacent node on the circumference.

15. The data management method according to claim 14, further comprising a process in which the data analyzer computes hash values equal in number to processing capabilities of the nodes according to the hash function and designates an allocation time range of a virtual node by mapping the hash values to the circumference and distributing the mapped hash values in an allocation time range obtained by dividing the time range by a total value of the hash values of the nodes mapped to the circumference.

16. The data management method according to claim 12, further comprising a process in which, when the reading of the node is not performed, the data analyzer of the other node recovers the accumulated data of the node from the replicated data of the accumulated data of the node stored by its own node and designates unreadable accumulated data of the node as its own accumulated data.

* * * * *